United States Patent
Asano et al.

(10) Patent No.: US 9,787,912 B2
(45) Date of Patent: Oct. 10, 2017

(54) IMAGE CAPTURE DEVICE

(71) Applicant: Panasonic Intellectual Property Management Co., Ltd., Osaka (JP)

(72) Inventors: Takuya Asano, Hyogo (JP); Tohru Yamada, Kyoto (JP); Junichi Matsuo, Osaka (JP); Toshiya Fujii, Shiga (JP); Nobukazu Teranishi, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 232 days.

(21) Appl. No.: 14/565,224

(22) Filed: Dec. 9, 2014

(65) Prior Publication Data

US 2015/0092019 A1  Apr. 2, 2015

Related U.S. Application Data

(63) Continuation of application No. PCT/JP2013/003693, filed on Jun. 12, 2013.

(30) Foreign Application Priority Data

Jun. 28, 2012  (JP) .................................. 2012-145385

(51) Int. Cl.
*H04R 5/02*    (2006.01)
*H04N 5/33*    (2006.01)
(Continued)

(52) U.S. Cl.
CPC .............. *H04N 5/33* (2013.01); *G01B 11/026* (2013.01); *G01C 3/085* (2013.01); *G01C 11/04* (2013.01);
(Continued)

(58) Field of Classification Search
CPC ....... G01B 11/026; G01C 11/04; G01C 11/30; G01C 2011/36; G01C 3/085;
(Continued)

(56) References Cited

U.S. PATENT DOCUMENTS 8,098,310 B2 * 1/2012 Kobayashi ........... H04N 5/2353
                                                        348/294
8,908,070 B2 * 12/2014 Uranishi ........... H01L 27/14818
                                                        348/222.1
(Continued)

FOREIGN PATENT DOCUMENTS

JP    2000-236486 A    8/2000
JP    2003-051987 A    2/2003
(Continued)

OTHER PUBLICATIONS

Frojdh et al, Imaing Properties of Scintillator Coated Silicon CCDs, 1999.*

(Continued)

*Primary Examiner* — Shan Elahi
(74) *Attorney, Agent, or Firm* — McDermott Will & Emery LLP

(57) ABSTRACT

Read electrodes are provided to drain signal charge of pixels from photoelectric conversion units provided in the pixels separately to a vertical transfer unit. During a first exposure period during which an object is illuminated with infrared light, signal charge obtained from a first pixel, and signal charge obtained from a second pixel adjacent to the first pixel, are added together in the vertical transfer unit to produce first signal charge. During a second exposure period during which the object is not illuminated with infrared light, signal charge obtained from the first pixel, and signal charge obtained from the second pixel adjacent to the first pixel, are transferred without being added to the first signal charge in the vertical transfer unit, and are added together in another packet to produce second signal charge.

18 Claims, 29 Drawing Sheets

(51) Int. Cl.

| | | |
|---|---|---|
| G01C 3/08 | (2006.01) | |
| G01B 11/02 | (2006.01) | |
| H04N 5/225 | (2006.01) | |
| H04N 5/235 | (2006.01) | |
| H04N 5/347 | (2011.01) | |
| H04N 5/355 | (2011.01) | |
| H04N 5/372 | (2011.01) | |
| H04N 13/02 | (2006.01) | |
| G01C 11/04 | (2006.01) | |
| G01C 11/30 | (2006.01) | |
| H04N 13/00 | (2006.01) | |
| H04N 5/232 | (2006.01) | |
| G01C 11/36 | (2006.01) | |

(52) U.S. Cl.
CPC ........... *G01C 11/30* (2013.01); *H04N 5/2256* (2013.01); *H04N 5/2353* (2013.01); *H04N 5/2354* (2013.01); *H04N 5/23245* (2013.01); *H04N 5/347* (2013.01); *H04N 5/35572* (2013.01); *H04N 5/37213* (2013.01); *H04N 13/0022* (2013.01); *H04N 13/0253* (2013.01); *H04N 13/0271* (2013.01); *H04N 13/0296* (2013.01); *G01C 2011/36* (2013.01); *H04N 2013/0081* (2013.01)

(58) Field of Classification Search
CPC ........... H04N 13/0022; H04N 13/0253; H04N 13/0271; H04N 13/0296; H04N 2013/0081; H04N 5/2256; H04N 5/23245; H04N 5/2353; H04N 5/2354; H04N 5/33; H04N 5/347
USPC .......................................................... 348/46
See application file for complete search history.

(56) References Cited

U.S. PATENT DOCUMENTS

| | | | | |
|---|---|---|---|---|
| 2003/0209893 A1* | 11/2003 | Breed | ................. | B60J 10/00 280/735 |
| 2004/0051790 A1* | 3/2004 | Tamaru | ................. | H04N 5/202 348/223.1 |
| 2004/0169767 A1* | 9/2004 | Norita | ................. | H04N 5/23212 348/350 |
| 2004/0178478 A1* | 9/2004 | Shizukuishi | ........... | H04N 9/045 257/620 |
| 2004/0204792 A1* | 10/2004 | Taylor | ................. | A47L 9/2805 700/245 |
| 2005/0219392 A1* | 10/2005 | Suzuki | ................. | H04N 5/235 348/294 |
| 2005/0264662 A1* | 12/2005 | Suzuki | ............. | H01L 27/14603 348/294 |
| 2006/0114342 A1* | 6/2006 | Egawa | ................... | H04N 5/361 348/241 |
| 2006/0170795 A1* | 8/2006 | Higuchi | ............... | H04N 5/3575 348/241 |
| 2008/0088481 A1* | 4/2008 | Kumon | ................ | B60Q 1/1423 340/937 |
| 2008/0122933 A1 | 5/2008 | Murayama | | |
| 2011/0001957 A1* | 1/2011 | Braune | ................... | G01B 11/00 356/4.01 |
| 2011/0134026 A1* | 6/2011 | Kang | ...................... | G06F 3/011 345/156 |
| 2011/0141306 A1* | 6/2011 | Nakano | ................ | H04N 13/025 348/222.1 |
| 2011/0163361 A1* | 7/2011 | Kumesawa | ....... | H01L 27/14601 257/292 |
| 2011/0228152 A1* | 9/2011 | Egawa | ................... | H04N 5/243 348/300 |
| 2011/0253882 A1* | 10/2011 | Kumesawa | ....... | H01L 27/14601 250/208.1 |
| 2011/0292267 A1* | 12/2011 | Yonemura | ......... | H01L 27/14812 348/311 |
| 2011/0317005 A1* | 12/2011 | Atkinson | ............... | G01S 17/023 348/135 |
| 2012/0056982 A1* | 3/2012 | Katz | ..................... | H04N 13/025 348/43 |
| 2012/0140094 A1* | 6/2012 | Shpunt | ................. | H04N 5/2254 348/239 |
| 2012/0249416 A1* | 10/2012 | Maciocci | ................ | G06F 3/011 345/156 |
| 2012/0249829 A1* | 10/2012 | Izuha | ................ | H01L 27/14621 348/229.1 |
| 2014/0333728 A1* | 11/2014 | Navab | ..................... | G01S 7/497 348/47 |
| 2016/0182846 A1* | 6/2016 | Wan | ..................... | H04N 5/3765 348/302 |

FOREIGN PATENT DOCUMENTS

| | | |
|---|---|---|
| JP | 2007-325026 A | 12/2007 |
| JP | 2008-008700 A | 1/2008 |
| JP | 2009-174854 A | 8/2009 |
| JP | 2011-155702 A | 8/2011 |

OTHER PUBLICATIONS

Nixon et al, FA 11.1: 256x256 CMOS Active Pixel Sensor, 1996.*
International Search Report issued in International Application No. PCT/JP2013/003693 dated Jul. 23, 2013 with English translation.

* cited by examiner

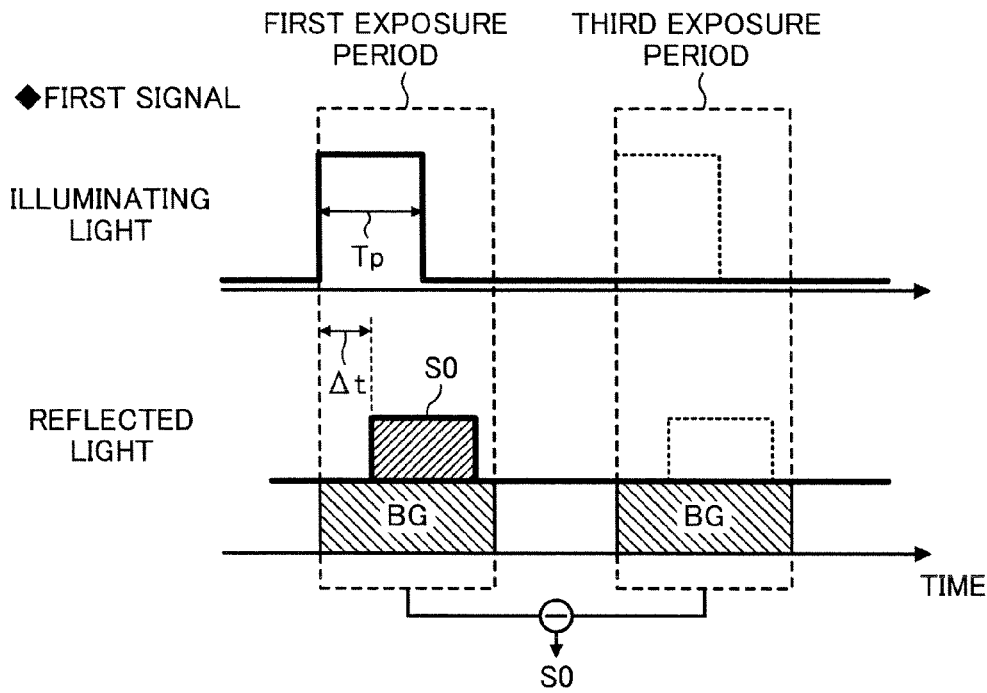
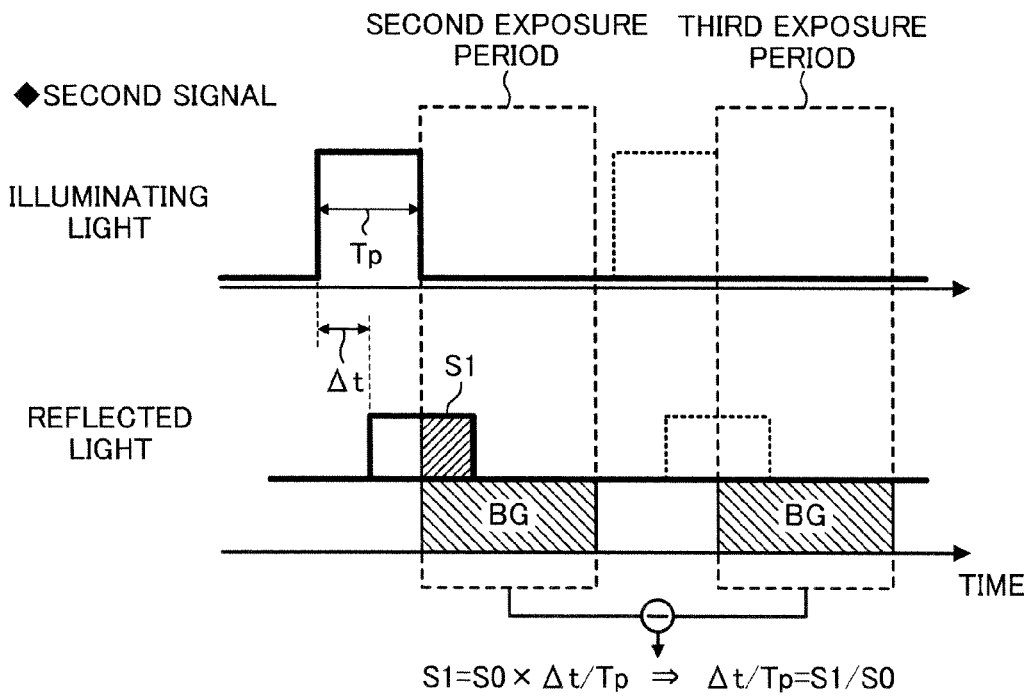
$S1 = S0 \times \Delta t/Tp \Rightarrow \Delta t/Tp = S1/S0$

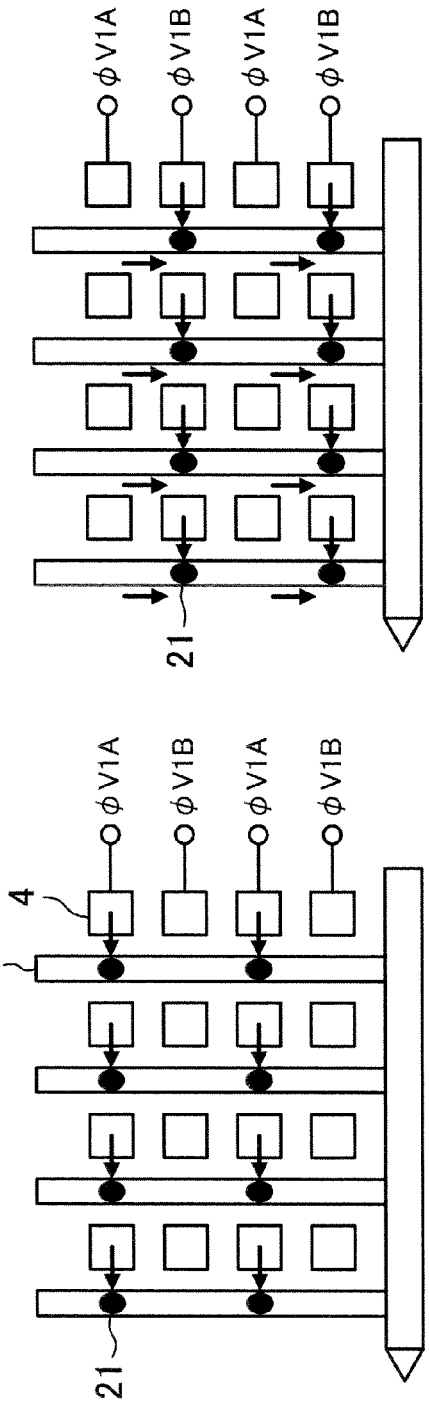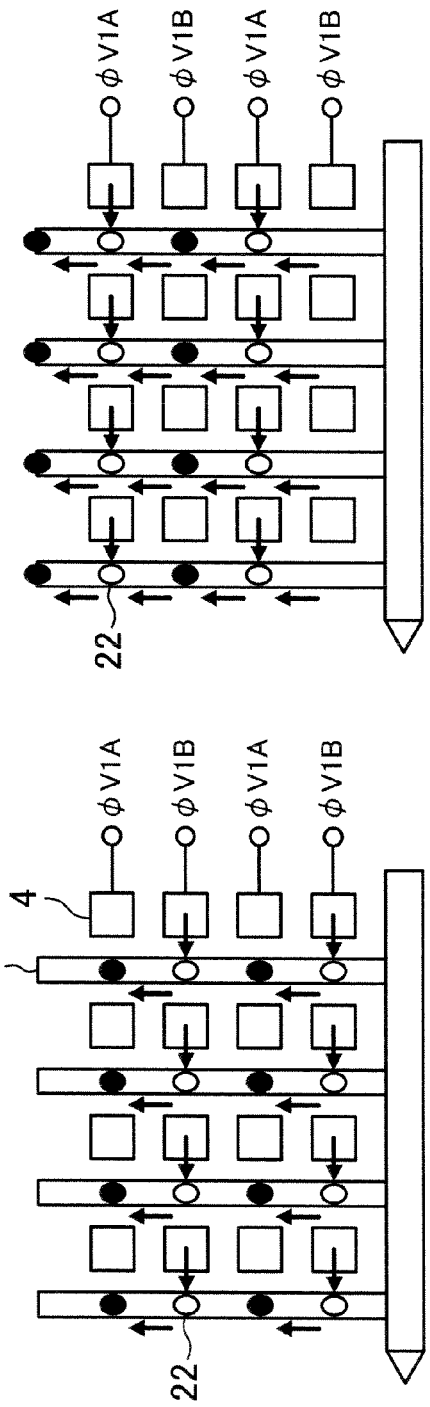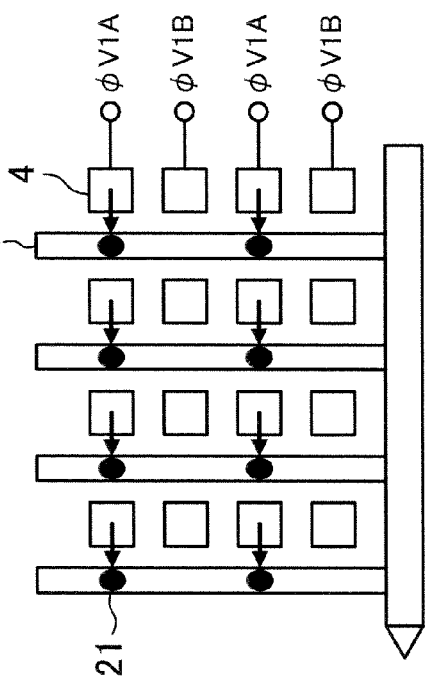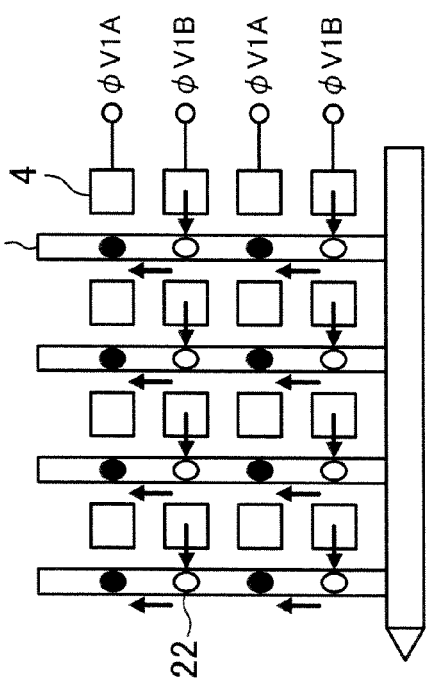

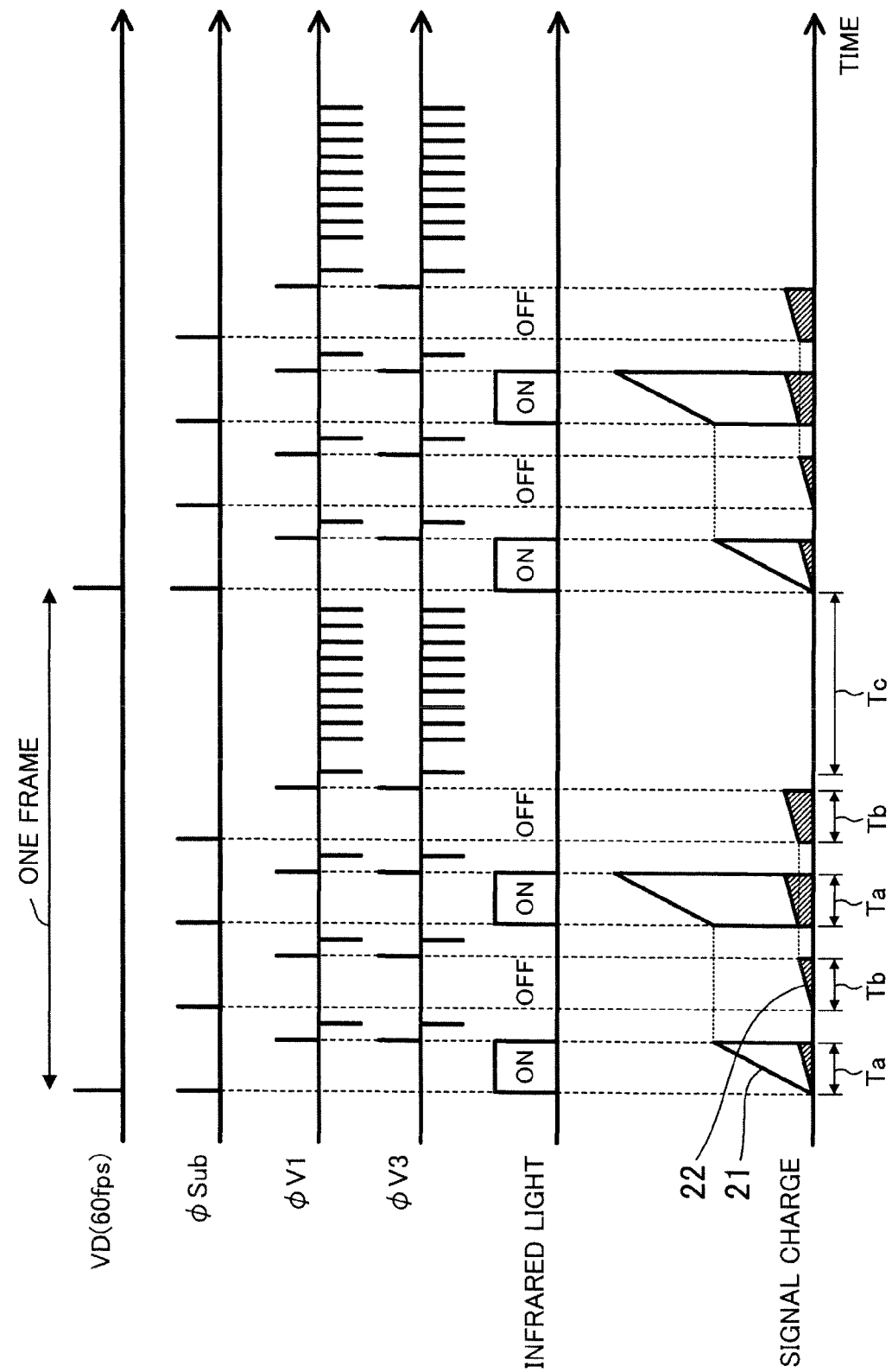

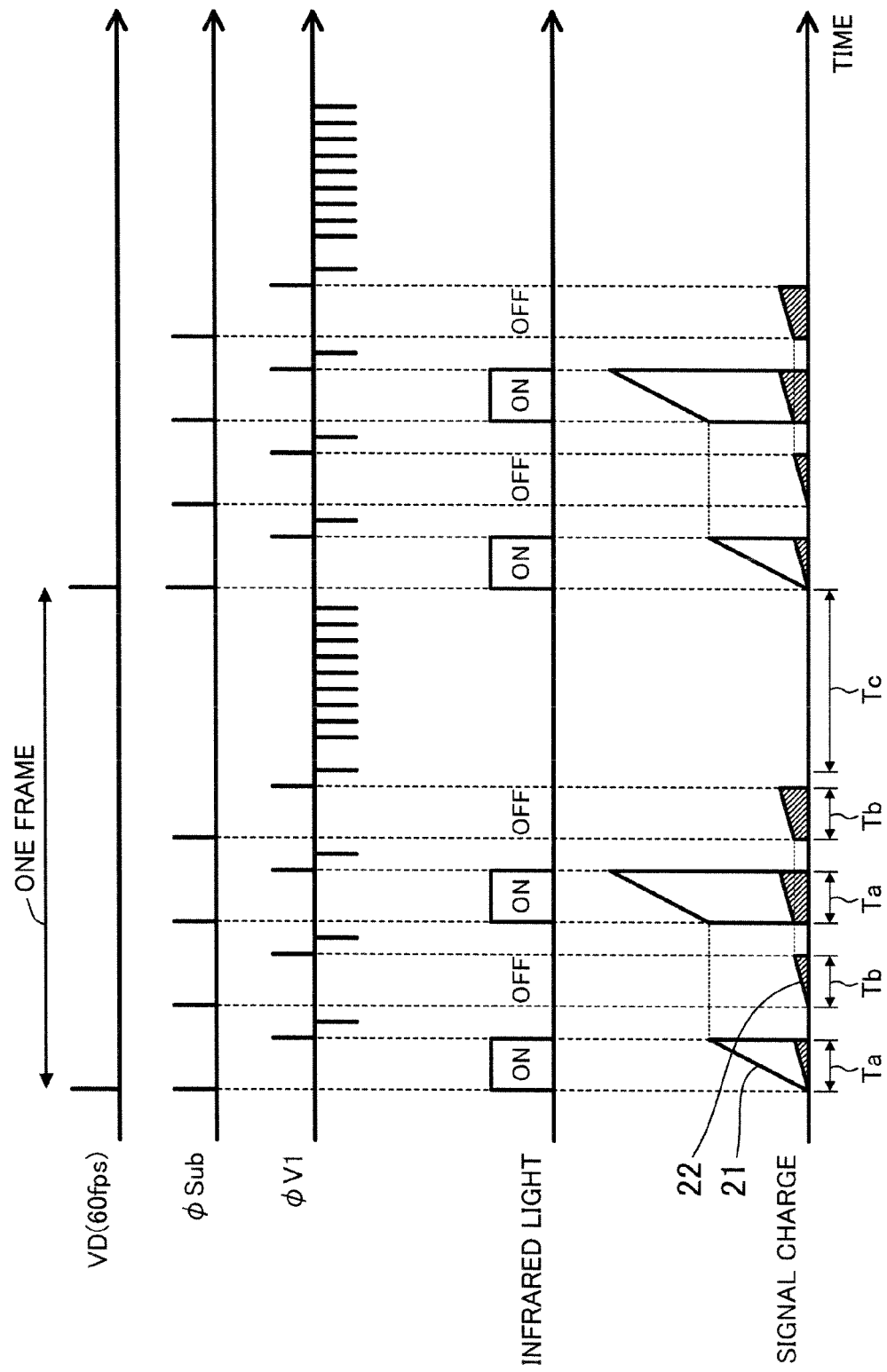

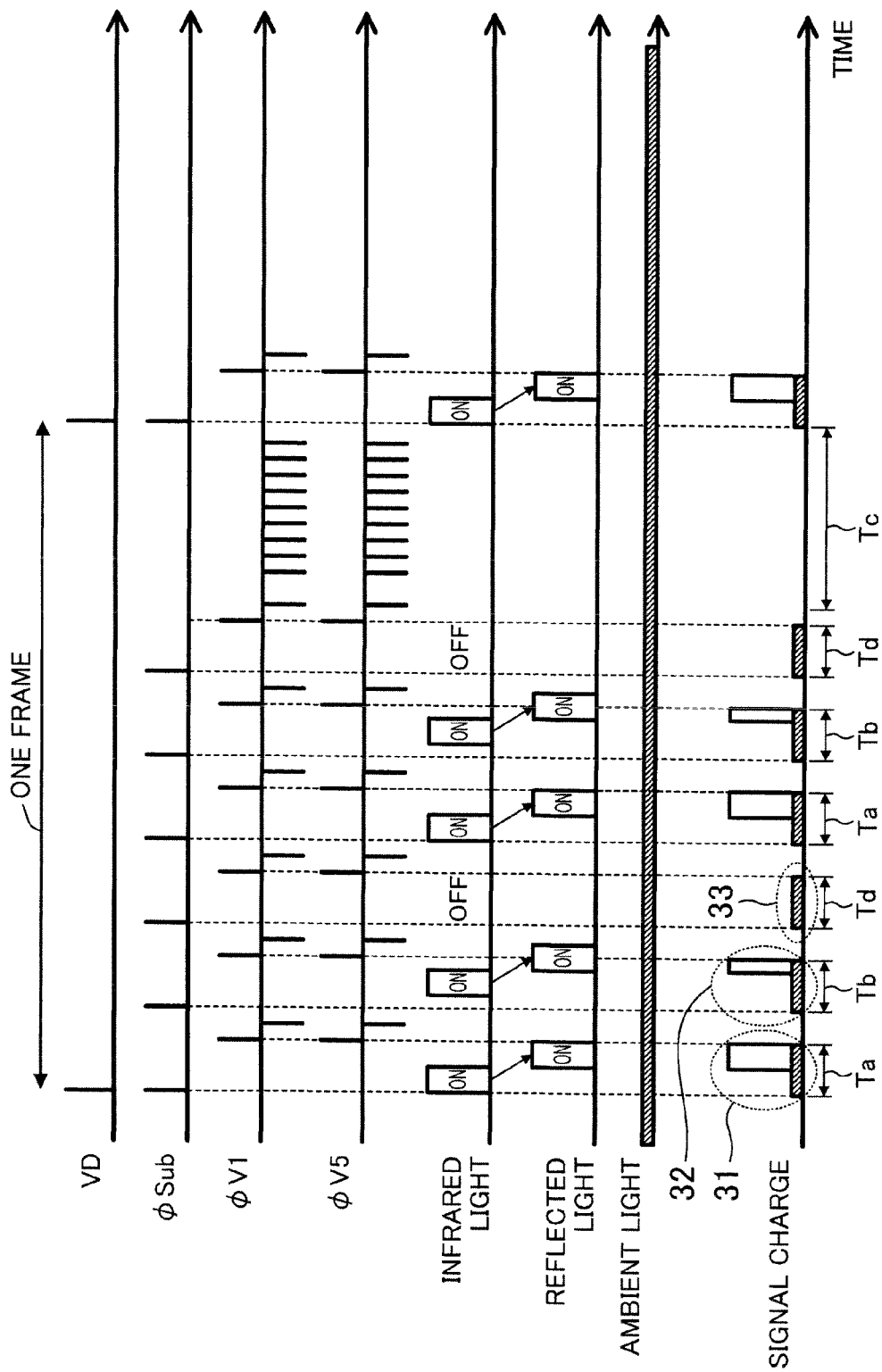

IMAGE CAPTURE DEVICE

CROSS-REFERENCE TO RELATED APPLICATIONS

This is a continuation of International Application No. PCT/JP2013/003693 filed on Jun. 12, 2013, which claims priority to Japanese Patent Application No. 2012-145385 filed on Jun. 28, 2012. The entire disclosures of these applications are incorporated by reference herein.

BACKGROUND

The present disclosure relates to image capture devices which convert incident light into an electrical signal, and output the electrical signal as a video signal.

Japanese Unexamined Patent Publication No. 2009-174854 describes a distance measuring camera having a function of measuring a distance to an object using infrared light. In general, a solid-state image capture device used in a distance measuring camera is called a distance measuring sensor. In particular, a camera for detecting a motion of the body or hand of a human as a subject, that is, for example, included in a game console, is also called a motion camera.

Japanese Unexamined Patent Publication No. 2000-236486 describes a solid-state image capture device having a vertical transfer electrode structure which allows for simultaneous reading of all pixels. Specifically, the device is a charge coupled device (CCD) image sensor in which a vertical transfer unit extending in the vertical direction is provided adjacent to each column of photodiodes (PDs). The vertical transfer unit includes four vertical transfer electrodes for each photodiode. At least one of the four vertical transfer electrodes also serves as a read electrode which is used to read out signal charge from the photodiode into the vertical transfer unit. The CCD image sensor also includes a vertical overflow drain (VOD) for draining signal charge from the photodiodes of all pixels.

Japanese Unexamined Patent Publication No. 2000-236486 above assumes a situation where the solid-state image capture device is used as a distance measuring sensor. Initially, an image is captured by illumination with infrared light. At this time, signal charge obtained by illumination with infrared light is read from photodiodes located in odd-numbered rows into the vertical transfer unit. Signal charge accumulated in photodiodes located in even-numbered rows is drain off to the substrate. Next, an image is captured without illumination with infrared light. At this time, while the positions of the signal charge in the vertical transfer unit are maintained, signal charge obtained without illumination with infrared light is read from photodiodes located in even-numbered rows into the vertical transfer unit. Signal charge accumulated in photodiodes located in odd-numbered rows is drained off to the substrate. Thereafter, signal charge accumulated in the vertical transfer unit is sequentially transferred and output. By subtracting signal charge obtained without illumination with infrared light from signal charge obtained by illumination with infrared light, a distance image can be obtained from which an influence of an infrared light component in the ambient light has been removed.

However, in this case, the following problems arise. Firstly, when signal charge obtained without illumination with infrared light is subtracted from signal charge obtained by illumination with infrared light, there is a one-pixel difference in position between the former and latter signal charge. This subtraction reduces the resolution in the subtraction direction by a half. Also, the rate of use of signal charge is 50% due to the drainage, resulting in a reduction in sensitivity. In addition, there is a difference in exposure timing between signal charge obtained by illumination with infrared light and signal charge obtained without illumination with infrared light, and therefore, error is likely to occur in the result of distance measurement, particularly when an image of a fast-moving object is captured.

SUMMARY

The present disclosure describes implementations of an image capture device for more efficiently obtaining a higher-precision distance image.

An image capture device according to an embodiment of the present disclosure includes an infrared light source configured to illuminate an object with infrared light, and a solid-state image capture device including first pixels and second pixels adjacent to the respective corresponding first pixels, the first and second pixels being arranged in a matrix. The solid-state image capture device includes a photoelectric conversion unit configured to convert incident light from the object into signal charge, a read electrode configured to read the signal charge from the photoelectric conversion unit, and a vertical transfer unit including a plurality of electrodes and configured to read all pixels and transfer the signal charge in an upward column direction and a downward column direction. In the solid-state image capture device, there is a repetition of a first exposure period and a second exposure period during one frame scanning period. During the first exposure period, the signal charge from the first pixel and the signal charge from the second pixel adjacent to the first pixel are added together in the vertical transfer unit to produce first signal charge. During the second exposure period, the signal charge from the first pixel and the signal charge from the second pixel adjacent to the first pixel are transferred without being added to the first signal charge in the vertical transfer unit, and are added together in another packet to produce second signal charge.

According to this embodiment, signal charge from two adjacent pixels is added together, and therefore, signal charge caused by illumination with infrared light and signal charge caused by an infrared light component of ambient light can be read from the same two pixels. As a result, two types of signal charge can be subtracted from each other without causing a pixel mismatch. Also, during each exposure period, signal charge is read from all pixels, and therefore, the rate of use of signal charge is 100%. Moreover, reading is performed a plurality of times within one frame period, and therefore, the time lag between the two types of signal charge is reduced, whereby an image of an object having a motion can be captured.

According to the present disclosure, an image capture device can be provided which can capture a higher-quality and higher-precision distance image by illumination with infrared light while reducing the power consumption and heat generation of the entire system, by changing drive schemes.

BRIEF DESCRIPTION OF THE DRAWINGS

FIGS. 14A and 14B are diagrams for describing the principle of operation of the TOF distance measuring camera based on the timing diagram of FIG. 13.

FIGS. 17A, 17B, 17C, and 17D are diagrams schematically showing a flow of signal charge within one frame period in the solid-state image capture device of FIG. 15.

FIG. 19 is a drive timing diagram of the solid-state image capture device of FIG. 18.

FIG. 27 is a drive timing diagram of the solid-state image capture device of FIG. 26.

FIG. 31 is a drive timing diagram of the solid-state image capture device of FIG. 30.

DETAILED DESCRIPTION

Figure 1:
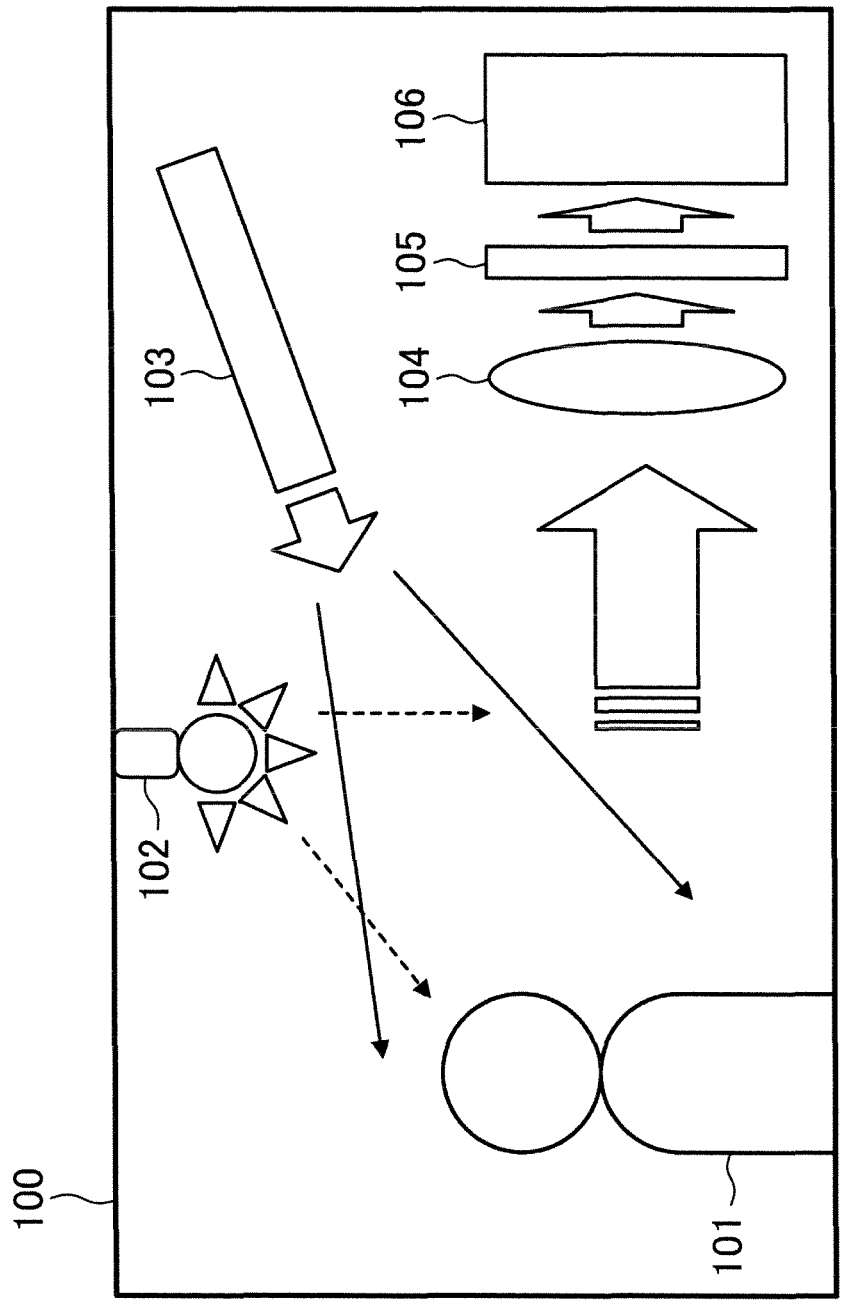
FIG. 1 is a diagram schematically showing a configuration of a distance measuring camera including a solid-state image capture device according to the present disclosure.

Embodiments will now be described in detail with reference to the accompanying drawings. The description and drawings are merely for illustrative purposes and are in no way intended to limit the scope of the present disclosure. Elements having substantially same configuration, operation, and effect are indicated by the same reference characters in the drawings.

FIG. 1 is a diagram schematically showing a configuration of a distance measuring camera including a solid-state image capture device according to the present disclosure. As shown in FIG. 1, in an image capture target space 100, an object 101 is illuminated with infrared laser light having a wavelength of 850 nm from an infrared light source 103 in the presence of ambient illumination 102. The reflected light is brought to a solid-state image capture device 106 through an optical lens 104, and an optical filter 105 which allows near-infrared wavelengths in the vicinity of 850 nm to pass, to form an image on the solid-state image capture device 106, which then converts the image into an electrical signal. The infrared light source 103, the optical lens 104, the optical filter 105, and the solid-state image capture device 106 such as a CCD image sensor, form a distance measuring camera.

There are several types of distance measuring cameras, such as stereo, pattern projection, time of flight (TOF), etc. Any of them may be employed.

Figure 2:
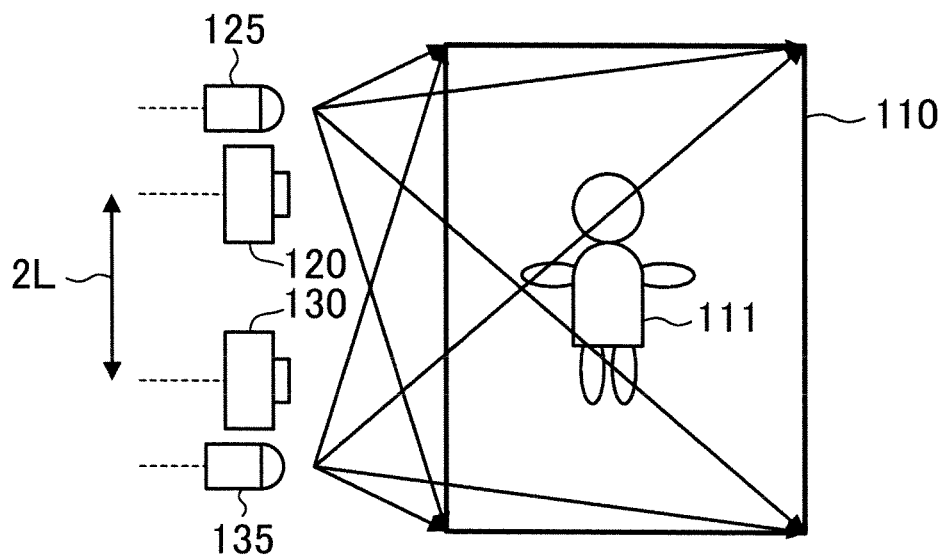
FIG. 2 is a diagram for describing a distance measuring technique of a stereo distance measuring camera.

FIG. 2 is a diagram for describing a distance measuring technique of a stereo distance measuring camera. A pair of a camera 120 and an infrared light source 125 and another pair of a camera 130 and an infrared light source 135 are arranged with respect to an object 111 in an image capture target space 110. The distance between the optical axes of the cameras 120 and 130 is represented by 2L. L is called a baseline length.

Figure 3:
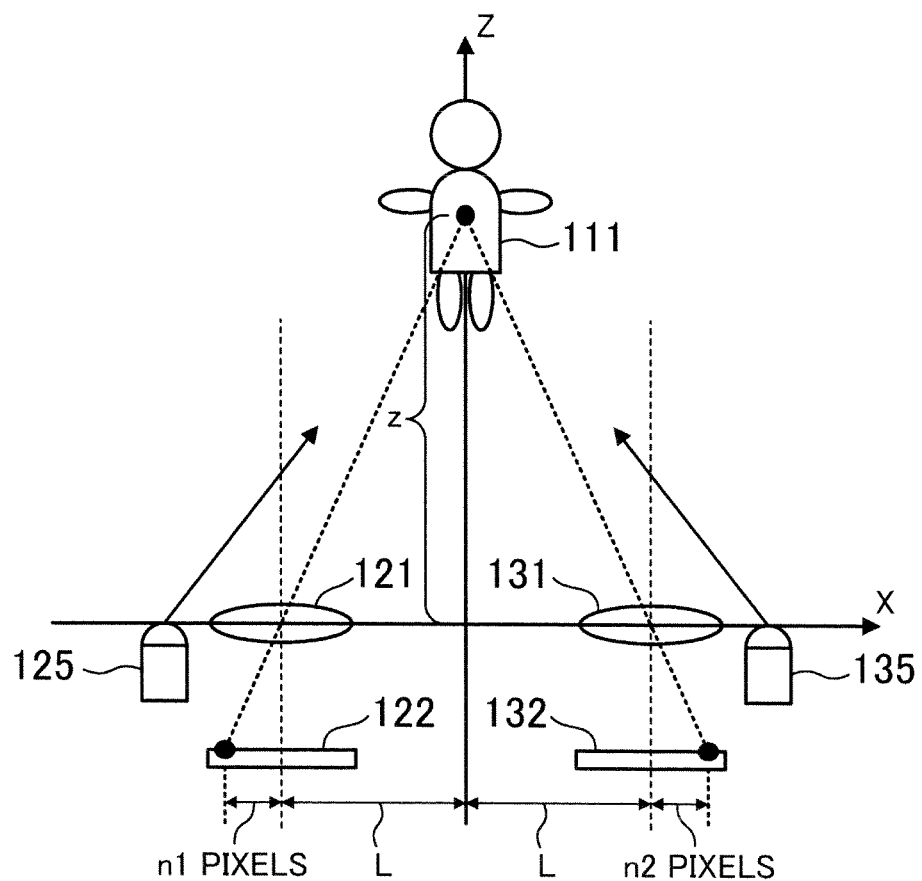
FIG. 3 is a diagram for describing the principle of operation of the stereo distance measuring camera.

FIG. 3 is a diagram for describing the principle of operation of the stereo distance measuring camera. The infrared light sources 125 and 135 illuminate the object 111 with infrared light. The camera 120 has a lens 121 and a solid-state image capture device 122. In the camera 120, a spot of infrared light is formed at a position which is n1 pixels away from the center. The camera 130 has a lens 131 and a solid-state image capture device 132. In the camera 130, a spot of infrared light is formed at a position which is n2 pixels away from the center. Based on these results, a distance z to the object 111 is calculated using triangulation.

Figure 4:
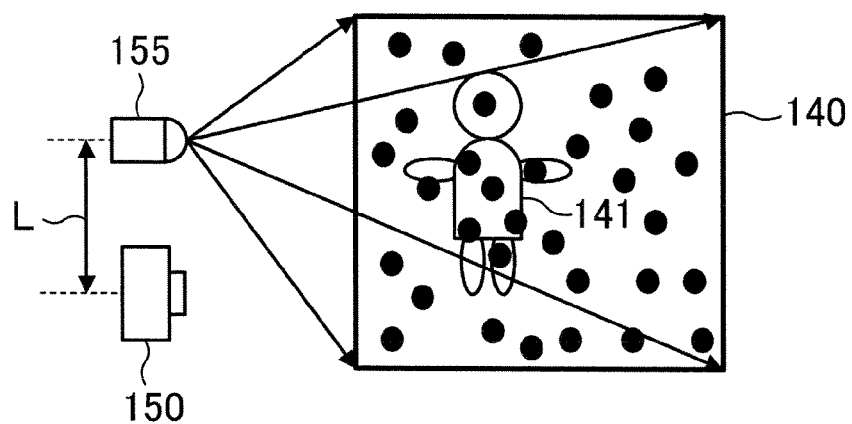
FIG. 4 is a diagram for describing a distance measuring technique of a pattern projection distance measuring camera.

FIG. 4 is a diagram for describing a distance measuring technique of a pattern projection distance measuring camera. A pair of a camera 150 and an infrared light source 155 is arranged with respect to an object 141 in an image capture target space 140. The infrared light source 155 illuminates the image capture target space 140 including the object 141 with a predetermined pattern of infrared light. Also, here, the baseline length is represented by L.

Figure 5A:
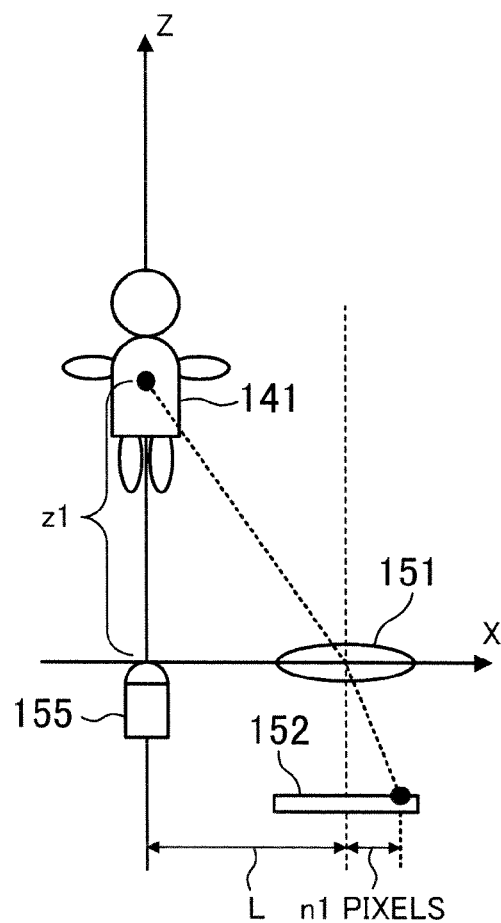
FIGS. 5A and 5B are diagrams for describing the principle of operation of the pattern projection distance measuring camera.
Figure 5B:
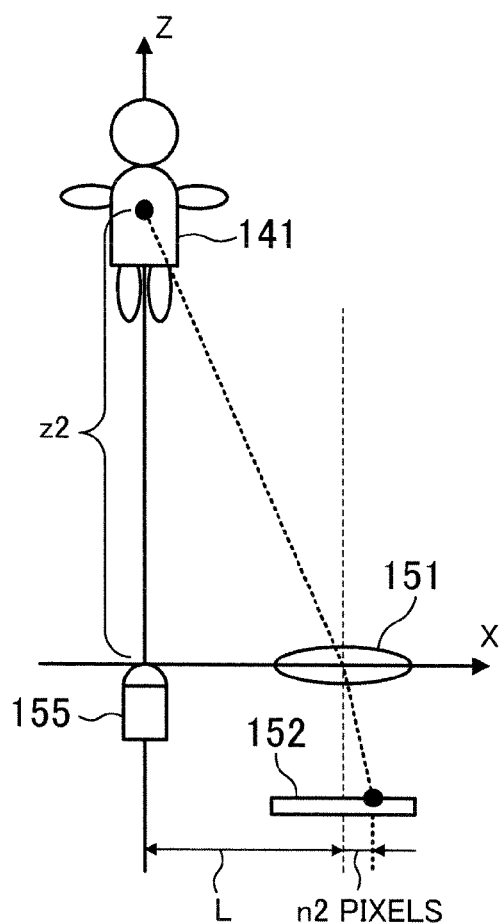

FIGS. 5A and 5B are diagrams for describing the principle of operation of the pattern projection distance measuring camera. The camera 150, which has a lens 151 and a solid-state image capture device 152, calculates a distance to the object 141 based on a difference in position between projected patterns (the difference between z1 and z2).

Figure 6:
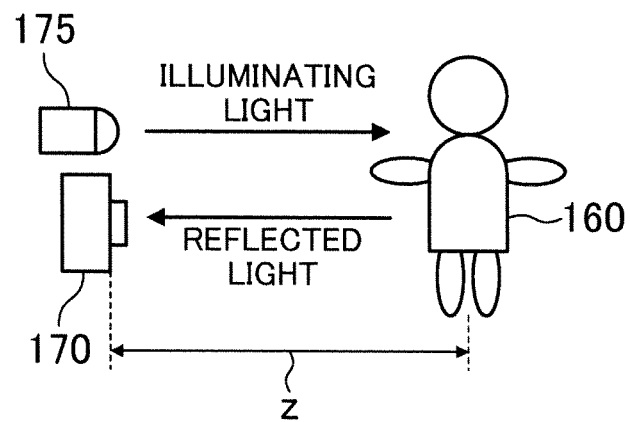
FIG. 6 is a diagram for describing a distance measuring technique of a TOF distance measuring camera.

FIG. 6 is a diagram for describing a distance measuring technique of a TOF distance measuring camera. Also, here, a pair of a camera 170 and an infrared light source 175 is arranged with respect to an object 160. The infrared light source 175 illuminates the object 160 located at a distance z with pulsed light. The infrared light striking the object 160 is reflected. The camera 170 receives the reflected light.

Figure 7:
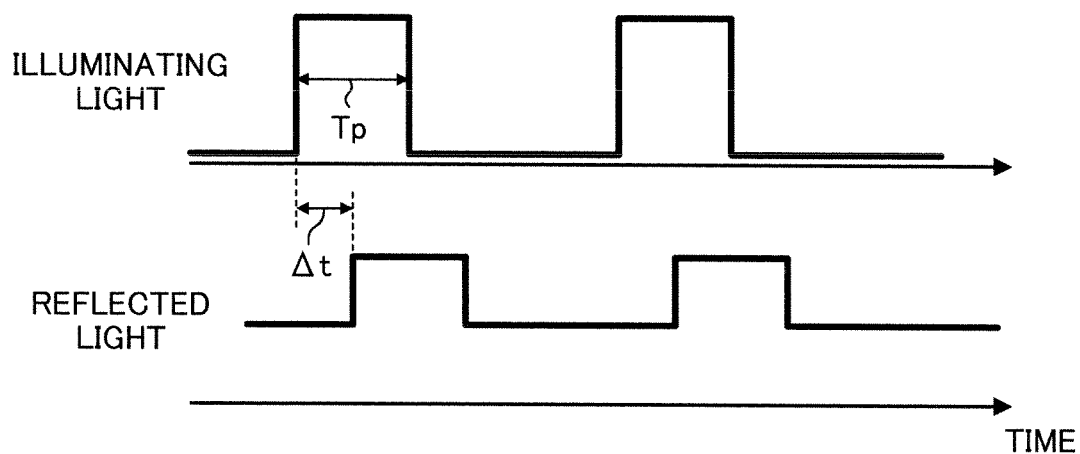
FIG. 7 is a first timing diagram of the TOF distance measuring camera.

FIG. 7 is a first timing diagram of the TOF distance measuring camera. The pulse width of the illuminating light is represented by Tp, and a delay between the illuminating light and the reflected light is represented by $\Delta t$.

Figure 8A:
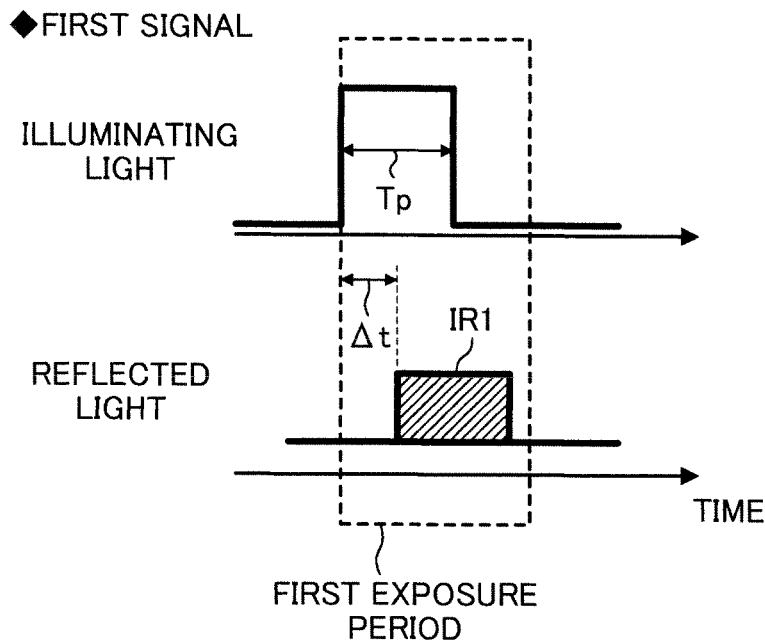
FIGS. 8A and 8B are diagrams for describing the principle of operation of the TOF distance measuring camera based on the timing diagram of FIG. 7.
Figure 8B:
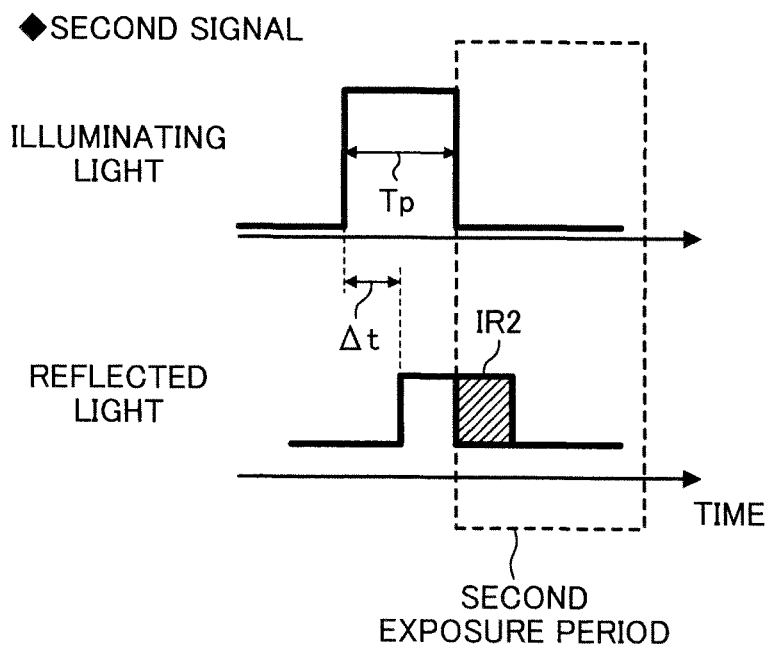

FIGS. 8A and 8B are diagrams for describing the principle of operation of the TOF distance measuring camera based on the timing diagram of FIG. 7. This technique is hereinafter referred to as a first TOF technique. As shown in FIG. 8A, a size of a first signal obtained by the camera 170 is the amount of signal charge IR1 based on the reflected light during a first exposure period which begins from the rise time of the pulse of the illuminating light. On the other hand, as shown in FIG. 8B, a size of a second signal obtained by the camera 170 is the amount of signal charge IR2 based on the reflected light during a second exposure period which begins from the fall time of the pulse of the illuminating light. Here, the lengths of the first and second exposure periods are greater than the pulse width Tp of the illuminating light. A distance to the object 160 is represented by:

$$z = c \times \Delta t / 2$$
$$= (c \times Tp/2) \times (\Delta t / Tp)$$
$$= (c \times Tp/2) \times (IR2 / IR1)$$

where z is the distance to the object 160, and c is the speed of light.

Figure 9:
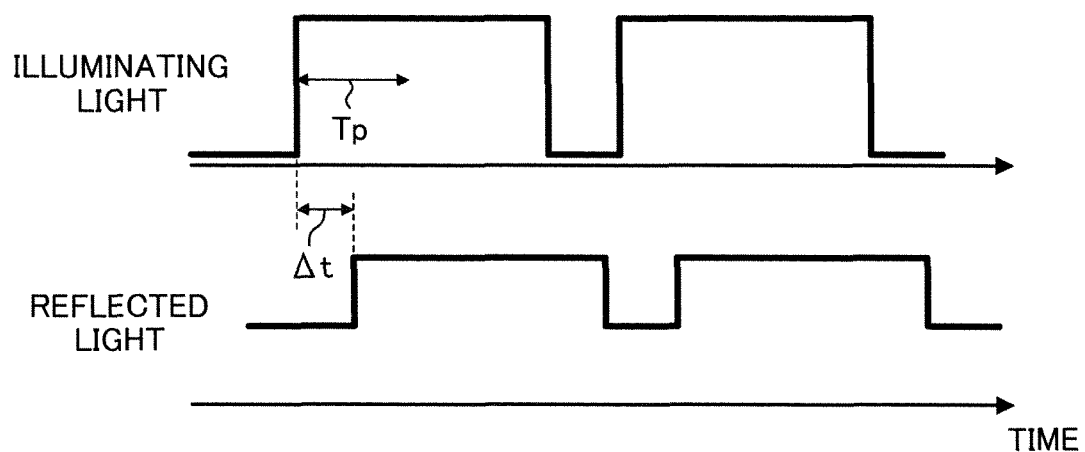
FIG. 9 is a second timing diagram of the TOF distance measuring camera.

FIG. 9 is a second timing diagram of the TOF distance measuring camera. Here, it is assumed that the pulse width of the illuminating light is longer than the period of time Tp.

Figure 10A:
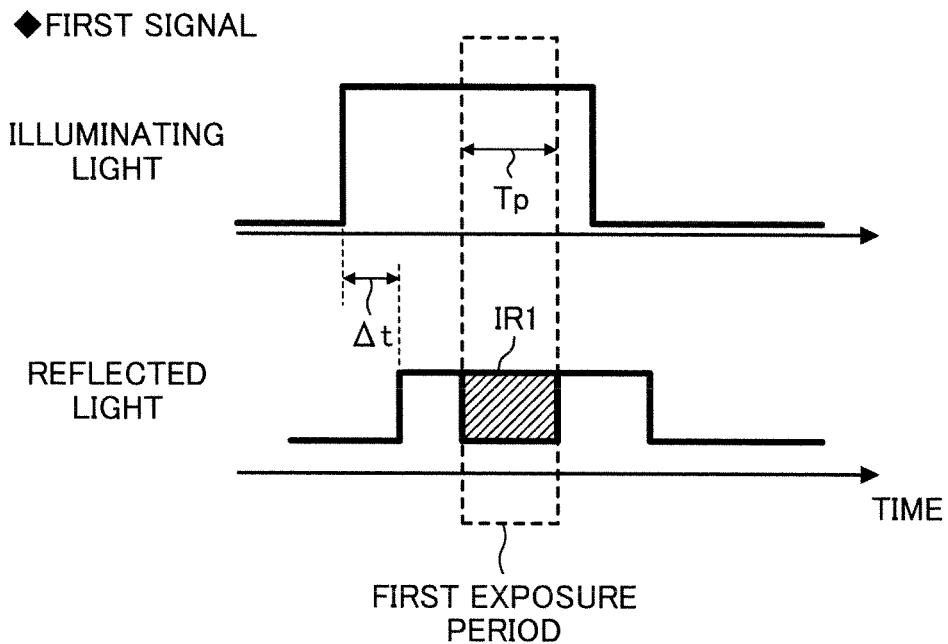
FIGS. 10A and 10B are diagrams for describing the principle of operation of the TOF distance measuring camera based on the timing diagram of FIG. 9.
Figure 10B:
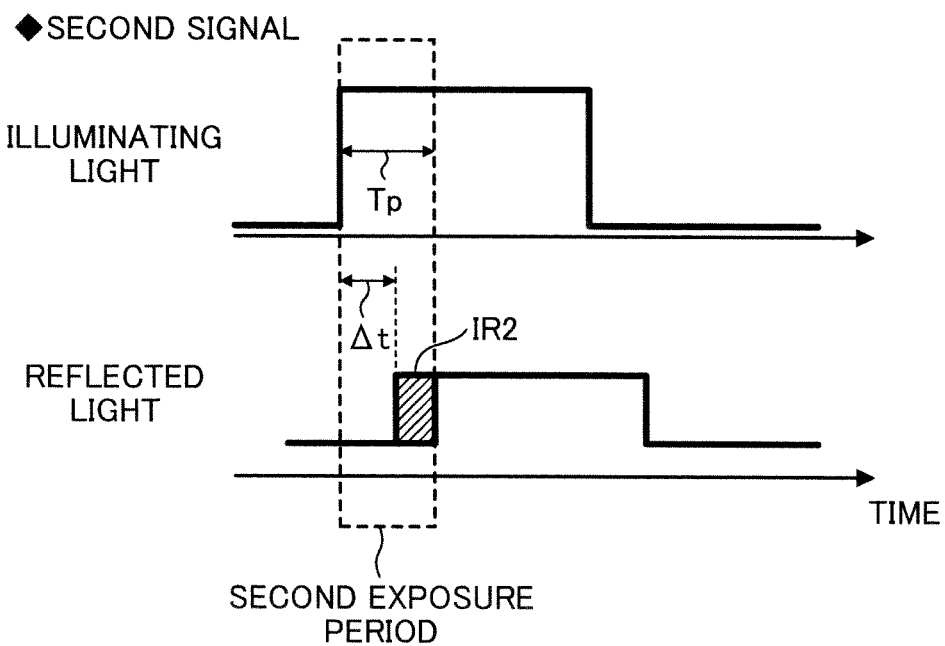

FIGS. 10A and 10B are diagrams for describing the principle of operation of the TOF distance measuring camera based on the timing diagram of FIG. 9. This technique is hereinafter referred to as a second TOF technique. As shown in FIG. 10A, a size of a first signal obtained by the camera 170 is the amount of signal charge IR1 based on the reflected light during a first exposure period (length: Tp) which begins later than the rise time of the pulse of the reflected light. On the other hand, as shown in FIG. 10B, a size of a second signal obtained by the camera 170 is the amount of signal charge IR2 based on the reflected light during a second exposure period (length: Tp) which begins from the rise time of the pulse of the illuminating light. In this case:

$$z = c \times \Delta t / 2$$
$$= (c \times Tp/2) \times (\Delta t / Tp)$$
$$= (c \times Tp/2) \times \{(IR2 - IR1) / IR1\}$$

Figure 11:
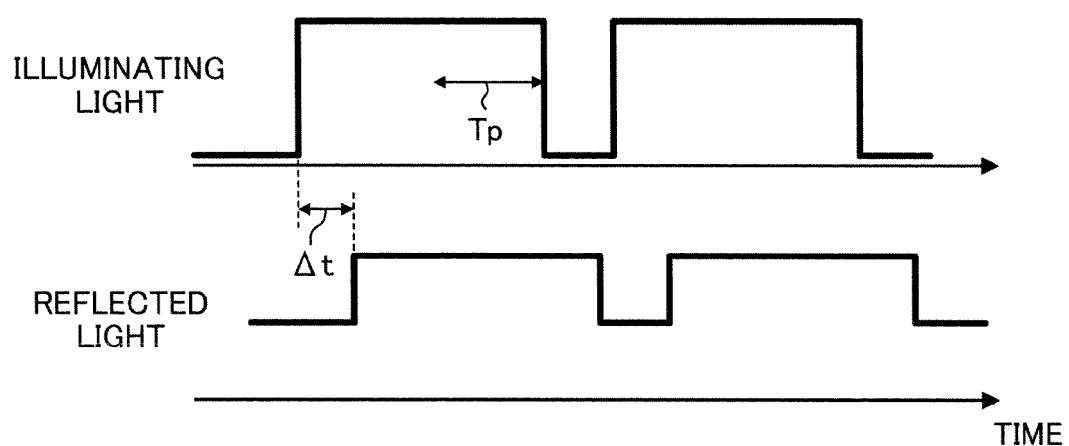
FIG. 11 is a third timing diagram of the TOF distance measuring camera.

FIG. 11 is a third timing diagram of the TOF distance measuring camera. Here, it is also assumed that the pulse width of the illuminating light is longer than the period of time Tp.

Figure 12A:
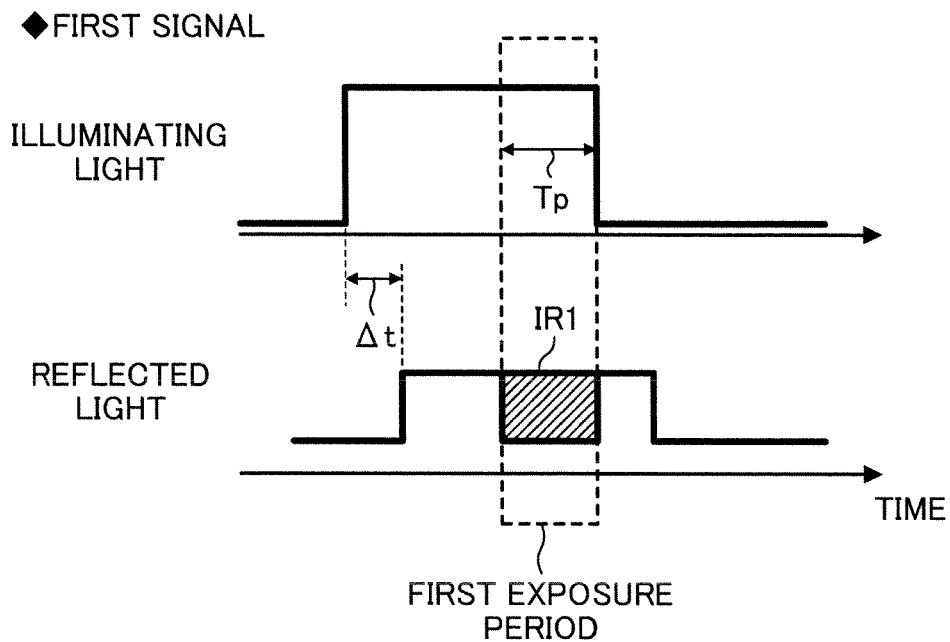
FIGS. 12A and 12B are diagrams for describing the principle of operation of the TOF distance measuring camera based on the timing diagram of FIG. 11.
Figure 12B:
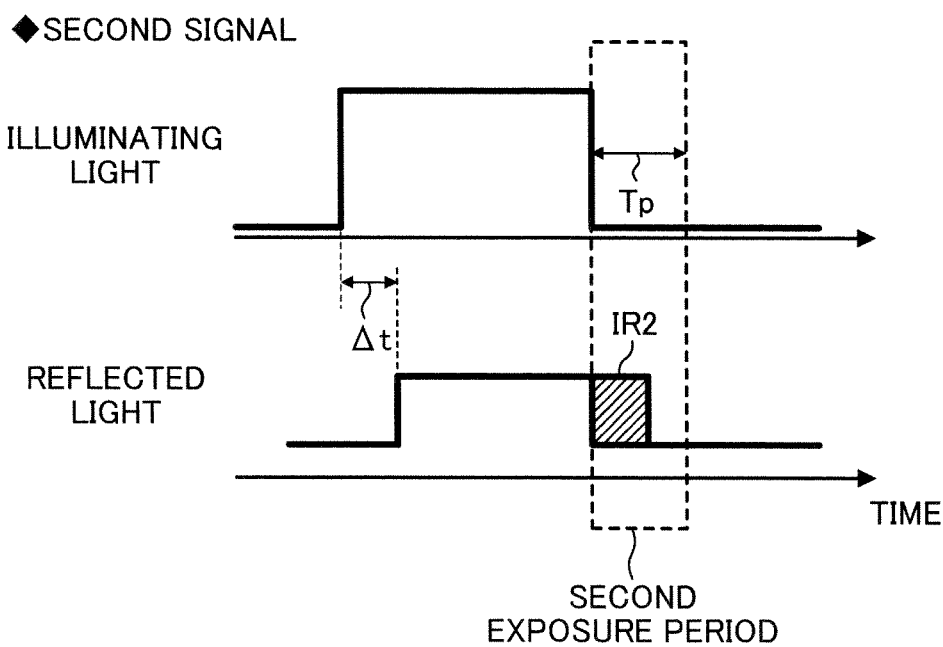

FIGS. 12A and 12B are diagrams for describing the principle of operation of the TOF distance measuring camera based on the timing diagram of FIG. 11. This technique is hereinafter referred to as a third TOF technique. As shown in FIG. 12A, a size of a first signal obtained by the camera 170 is the amount of signal charge IR1 based on the reflected light during a first exposure period (length: Tp) which ends at the fall time of the pulse of the illuminating light. On the other hand, as shown in FIG. 12B, a size of a second signal obtained by the camera 170 is the amount of signal charge IR2 based on the reflected light during a second exposure period (length: Tp) which begins from the fall time of the pulse of the illuminating light. In this case:

$$z = c \times \Delta t / 2$$
$$= (c \times Tp/2) \times (\Delta t / Tp)$$
$$= (c \times Tp/2) \times (IR2 / IR1)$$

In the first TOF technique of FIGS. 8A and 8B, unless the rise rate, fall rate, and half width of the pulse of the illuminating light of the infrared light source 175, and the stability during the time when the infrared light is on, are all controlled, error may occur in measurement of the distance z. In contrast to this, in the second TOF technique of FIGS. 10A and 10B and the third TOF technique of FIGS. 12A and 12B, not all of the factors need to be controlled, resulting in an increase in the ease of construction of the system. For example, in the second TOF technique of FIGS. 10A and 10B, during the first exposure period, only the stability during the time when the infrared light is on affects the calculation of the distance z, and during the second exposure period, only the rise rate of the pulse affects the calculation of the distance z. Therefore, for example, even if the fall rate of the pulse is somehow slow, the calculation of the distance z is not affected. Thus, the second TOF technique in which only the rise portion of the pulse of the illuminating light is used and the third TOF technique in which only the fall portion of the pulse of the illuminating light is used, are advantageous over the first TOF technique.

Figure 13:
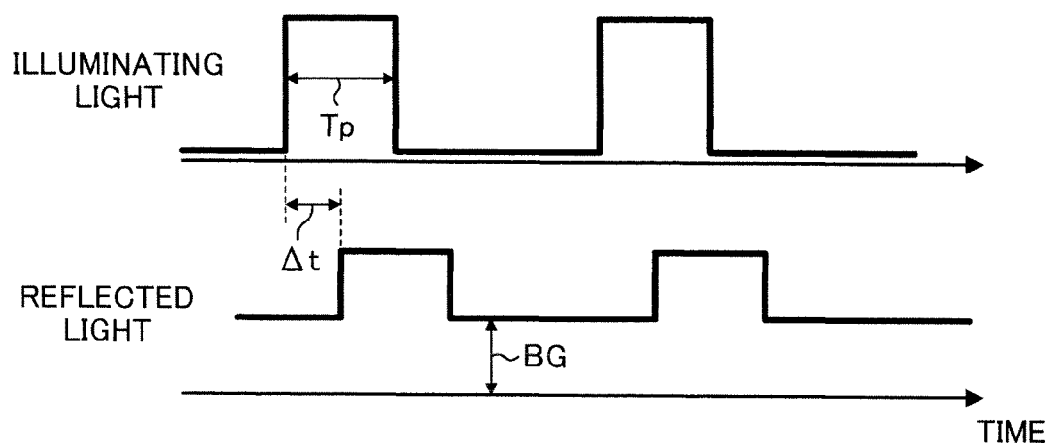
FIG. 13 is a fourth timing diagram of the TOF distance measuring camera.

FIG. 13 is a fourth timing diagram of the TOF distance measuring camera. The pulse width of the illuminating light is represented by Tp, the delay between the illuminating light and the reflected light is represented by $\Delta t$, and the ambient light component included in the reflected light is represented by BG.

FIGS. 14A and 14B are diagrams for describing the principle of operation of the TOF distance measuring camera based on the timing diagram of FIG. 13. This technique is hereinafter referred to as a fourth TOF technique. The reflected light includes the ambient light component BG, and therefore, it is desirable to remove the ambient light component BG before the calculation of the distance z. Therefore, a solid-state image capture device is employed which can hold three different types of signal charge.

Initially, as shown in FIG. 14A, the amount of signal charge based on the reflected light during the first exposure period which begins from the rise time of the pulse of the illuminating light, is S0+BG. The amount of signal charge only based on the ambient light during the third exposure period which does not have illumination with infrared light, is BG. Therefore, by calculating the difference between the two signal charge amounts, the size of the first signal obtained in the camera 170 is calculated to be S0. On the other hand, as shown in FIG. 14B, the amount of signal charge based on the reflected light during the second exposure period which begins from the fall time of the pulse of the illuminating light, is S1+BG. The amount of signal charge only based on the ambient light during the third exposure period which does not have illumination with infrared light, is BG. Therefore, by calculating the difference between the two signal charge amounts, the size of the second signal obtained in the camera 170 is calculated to be S1. A distance to the object 160 is represented by:

$$z = c \times \Delta t / 2$$
$$= (c \times Tp/2) \times (\Delta t / Tp)$$
$$= (c \times Tp/2) \times (S1/S0)$$

where z is the distance to the object 160, and c is the speed of light.

First to sixth embodiments of the above solid-state image capture device which is preferably used in a distance measuring camera will now be described.

<<First Embodiment>>

Figure 15:
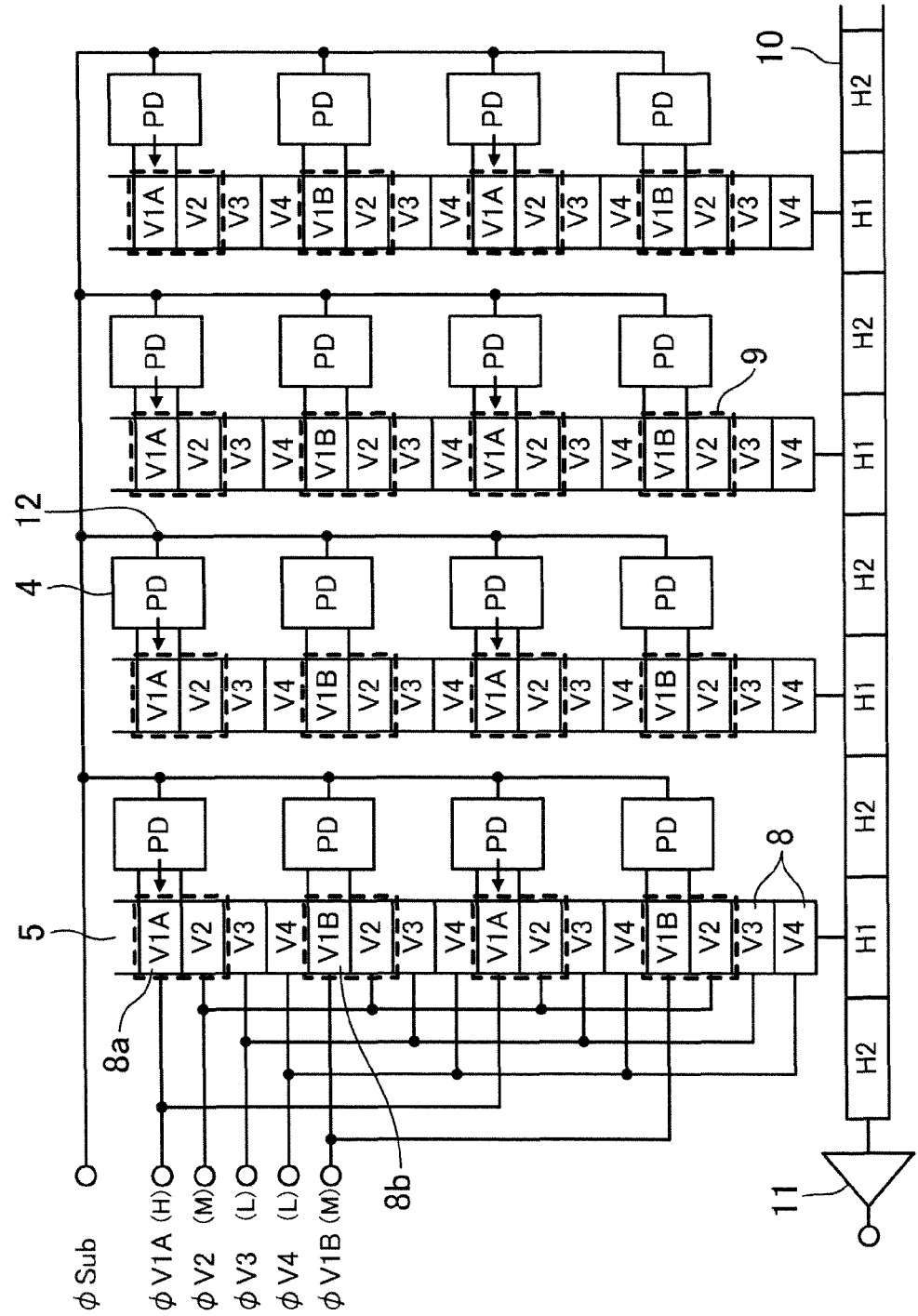
FIG. 15 is a diagram showing a configuration of a solid-state image capture device according to a first embodiment of the present disclosure.

FIG. 15 is a diagram showing a configuration of a solid-state image capture device according to a first embodiment of the present disclosure. Here, for the sake of simplicity, FIG. 15 shows only four pixels in each of the vertical and horizontal directions.

The solid-state image capture device includes a plurality of photoelectric conversion units (photodiodes) 4 which are arranged in a matrix on a semiconductor substrate and convert incident light into signal charge, vertical transfer units 5 which are provided, corresponding to the photoelectric conversion units 4 and transfer signal charge read from the photoelectric conversion units 4 in the column direction (vertical direction), a horizontal transfer unit 10 which transfers signal charge transferred by the vertical transfer units 5 in the row direction (horizontal direction), a charge detection unit 11 which outputs signal charge transferred by the horizontal transfer unit 10, and first read electrodes 8a and second read electrodes 8b which are provided, corresponding to the photoelectric conversion units 4, and read the photoelectric conversion units 4 on a row-by-row basis.

Here, the solid-state image capture device is an interline transfer CCD, in which all pixels can be read out (progressive scan). For example, the vertical transfer unit 5 is of the four-phase drive type, which includes four vertical transfer electrodes (gates) 8 per pixel, and the horizontal transfer unit 10 is of the two-phase drive type. The vertical transfer electrodes 8a and 8b of the four-phase drive vertical transfer unit 5 also serve as read electrodes for reading signal charge from the photoelectric conversion units 4. Signal charge accumulated in the photoelectric conversion units 4 is read out by and transferred to electrodes represented by signal packets 9, for example.

Each pixel is connected to a VOD 12 for draining signal charge from all pixels. Note that, for ease of understanding the present disclosure, the VOD 12 is shown on the same plane as and lateral to the pixel, and actually, is located in the bulk direction of the pixel (the depth direction of the semiconductor substrate). When a high voltage is applied to a terminal Sub of the VOD 12 which is connected to the substrate, the signal charge of all pixels is simultaneously drained off to the substrate.

Figure 16:
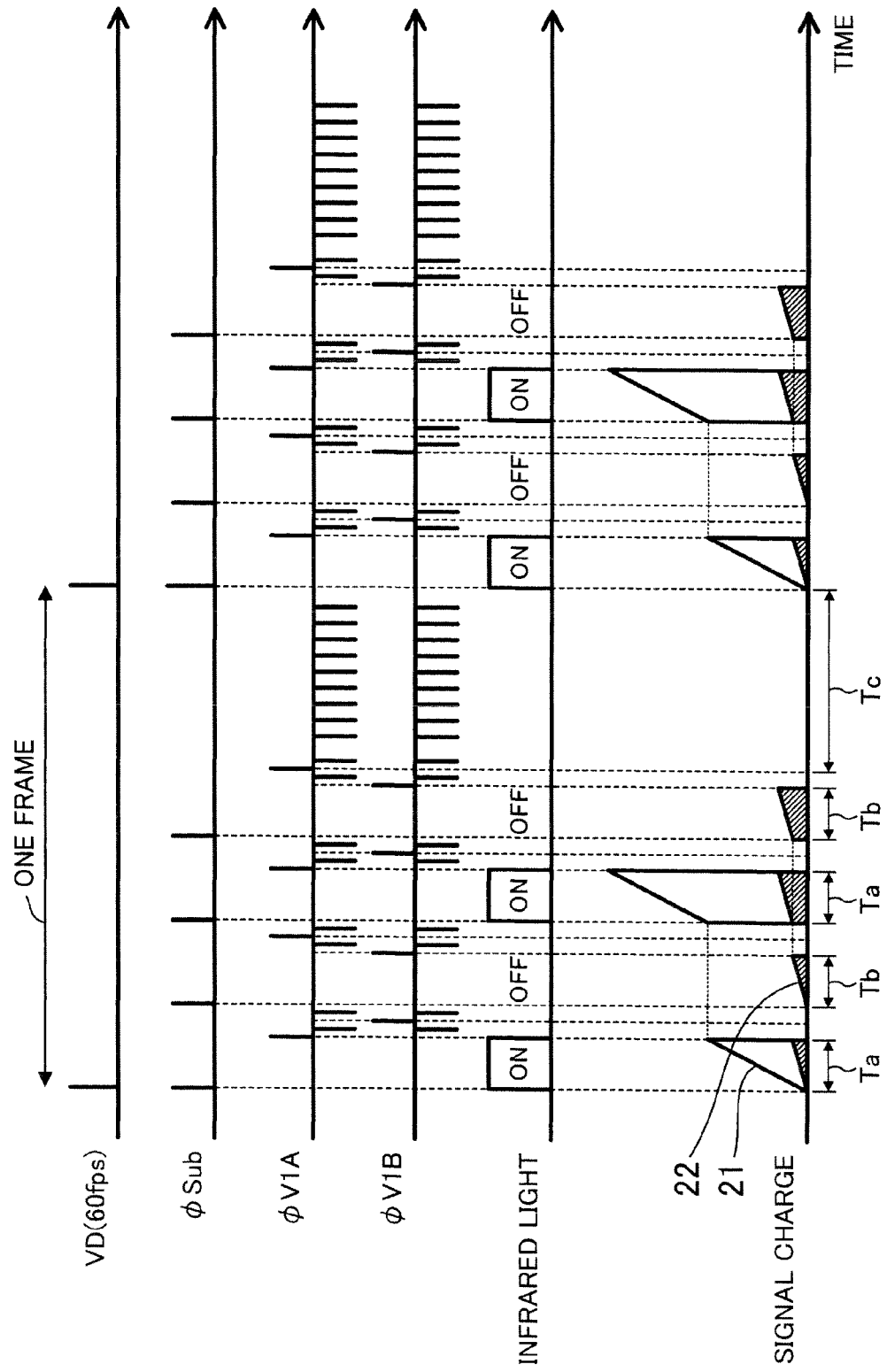
FIG. 16 is a drive timing diagram of the solid-state image capture device of FIG. 15.

Next, the timing of operation of the solid-state image capture device of FIG. 15 will be described with reference to FIGS. 16 and 17A, 17B, 17C, and 17D. FIG. 16 shows example drive timings at which signal charge of two vertically adjacent pixels is vertically transferred to be added together within one frame period. FIGS. 17A-17D schematically show how charge is added together and charge is transferred.

Firstly, as shown in FIG. 16, vertical synchronization pulses VD are generated at a rate of 60 frames per sec (fps). Signal charge 21 obtained in the presence of illumination with infrared light and signal charge 22 obtained in the presence of only ambient light, are both obtained during each frame period. In FIG. 16, for the sake of simplicity, image capture in the presence of illumination with infrared light and image capture in the presence of only ambient light are each performed two times per frame.

At the beginning of each frame, a substrate drainage pulse (φSub) is applied to drain signal charge from all pixels. After the end of application of φSub, a first infrared illumination exposure period Ta begins, and at the same time, infrared light is emitted. Because ambient light continues to be on, reflected light from an object includes both the emitted infrared light and ambient light.

Here, a read pulse is applied to φV1A so that the signal charge 21 is read into the vertical transfer unit 5, and then the first exposure period Ta ends. At the same time, the illumination with infrared light is stopped. In FIG. 15, an arrow projecting from the photoelectric conversion unit 4 indicates how, at this time, charge is read from the photoelectric conversion unit 4 into the vertical transfer unit 5.

Although, in this embodiment, the infrared illumination period coincides with the exposure period Ta, substantially no problem arises if the infrared illumination period does not include the ambient light exposure period Tb.

Thereafter, as shown in FIGS. 17A and 17B, the signal charge 21 read from one pixel is transferred to the adjacent pixel in the forward transfer direction (downward in FIGS. 17A-17D). Thereafter, a read pulse is applied to φV1B so that signal charge is read into the vertical transfer unit 5, and at this time, the signal charge is added to the signal charge previously read from φV1A. The sum of the signal charge 21 is vertically transferred by one pixel in a transfer direction (upward in FIGS. 17A-17D) opposite to the previous transfer direction.

Next, φSub is applied so that signal charge is drained from all pixels, and thereafter, as shown in FIG. 16, during the exposure period Tb, infrared light is not emitted, and signal charge caused only by an infrared light component emitted from something other than the infrared light source, i.e., ambient light, is accumulated in the photoelectric conversion unit 4.

Thereafter, at the end of the exposure period Tb, a read pulse is applied to φV1B, and as shown in FIG. 17C, the signal charge 22 caused by the ambient light component and accumulated in the photoelectric conversion unit 4 is read into the vertical transfer unit 5. At this time, the signal charge 22 is read into another packet so that the signal charge 22 is not added to the signal charge 21 previously caused by illumination with infrared light.

Thereafter, as shown in FIG. 17D, the signal charge 22 is vertically transferred by one pixel in the opposite direction, and by applying a read pulse to φV1A, the signals of the two vertically adjacent pixels are added together. At this time, the same two pixels as those whose signal charge 21 is previously added together, are combined as pixels whose signal charge is added together.

After the addition, the signal charge 21 and the signal charge 22 are vertically transferred by one pixel in the forward direction to be returned to the original positions, i.e., the same positions as those of FIG. 17A. Although the signal charge 22 is not shown in FIG. 17A, an empty packet between the positions of the signal charge 21 corresponds to the position of the signal charge 22 as shown in FIG. 17D.

In the case of the drive timing of FIG. 16, a set of the turning on and off of infrared illumination and the series of drive of FIGS. 17A-17D is performed two times within one frame period, and thereafter, outputting is performed during a transfer period Tc.

As described above, according to the solid-state image capture device of the first embodiment, two signals, i.e., the signal charge 21 obtained in the presence of illumination with infrared light and the signal charge 22 obtained in the presence of only ambient light, can be obtained from two pixels adjacent to each other in the vertical direction, and therefore, the pixel mismatch between the two signals can be eliminated. As a result, when ambient light is subtracted using the two signals, the two signals obtained from the same address are used in the subtraction, and therefore, an accurate distance image can be obtained. In addition, it is easy to design the pixel portion.

Moreover, in the solid-state image capture device of this embodiment, signal charge accumulated in all photodiodes is used by adding signal charge in adjacent pixels together, and therefore, no signal charge is drained off to the substrate, i.e., the efficiency is 100%. Also, the sensitivity is substantially doubled. Therefore, if the same amount of a signal caused by infrared light is needed, the power of the infrared light source for illumination can be reduced, or the exposure period can be shortened. In other words, the power consumption can be effectively reduced.

A drive for reading the signal charge 21 obtained in the presence of illumination with infrared light and the signal charge 22 obtained in the presence of only ambient light is performed two times during one frame period. Therefore, the time lag between the two signals is substantially reduced. As a result, even when an image of a fast-moving object is captured, and ambient light is subtracted using two signals, error is not likely to occur.

Note that the arrangement of signals output during the signal charge transfer period Tc is the same as the conventional one, and therefore, an existing signal processing system can be employed. As a result, the solid-state image capture device of the first embodiment can replace a conventional solid-state image capture device and can be easily handled. Thus, the solid-state image capture device of the first embodiment is highly compatible with existing systems.

As a result, a solid-state image capture device which can be used as a high-precision motion sensor can be provided while the power and heat generation of the entire system including illumination with infrared light are reduced. Although the turning on and off of illumination of infrared light is performed two times during one frame period in FIGS. 17A-17D for the sake of simplicity, the solid-state image capture device of the first embodiment is more effective for a fast-moving object as the number of times of that operation increases.

Although the drive of adding signal charges in two adjacent pixels together has been mainly described, a normal image can be captured instead of a distance image if signals are output from all pixels by a typical drive without performing the addition.

Note that the solid-state image capture device of the first embodiment is mainly used as a stereo or pattern projection distance measuring sensor.

<<Second Embodiment>>

A solid-state image capture device according to a second embodiment of the present disclosure will now be described, focusing on a difference from the first embodiment. The solid-state image capture device of the second embodiment is different from that of the first embodiment in the method of reading signal charge from two adjacent pixels, and in connection with this, in the configuration of the vertical transfer unit. Nevertheless, the solid-state image capture device of the second embodiment is intended to provide a structure in which signal charge in pixels adjacent to each other in the vertical direction can be added together, as with that of the first embodiment. The difference from the first embodiment will be mainly described, and the same points will not be described.

Figure 18:
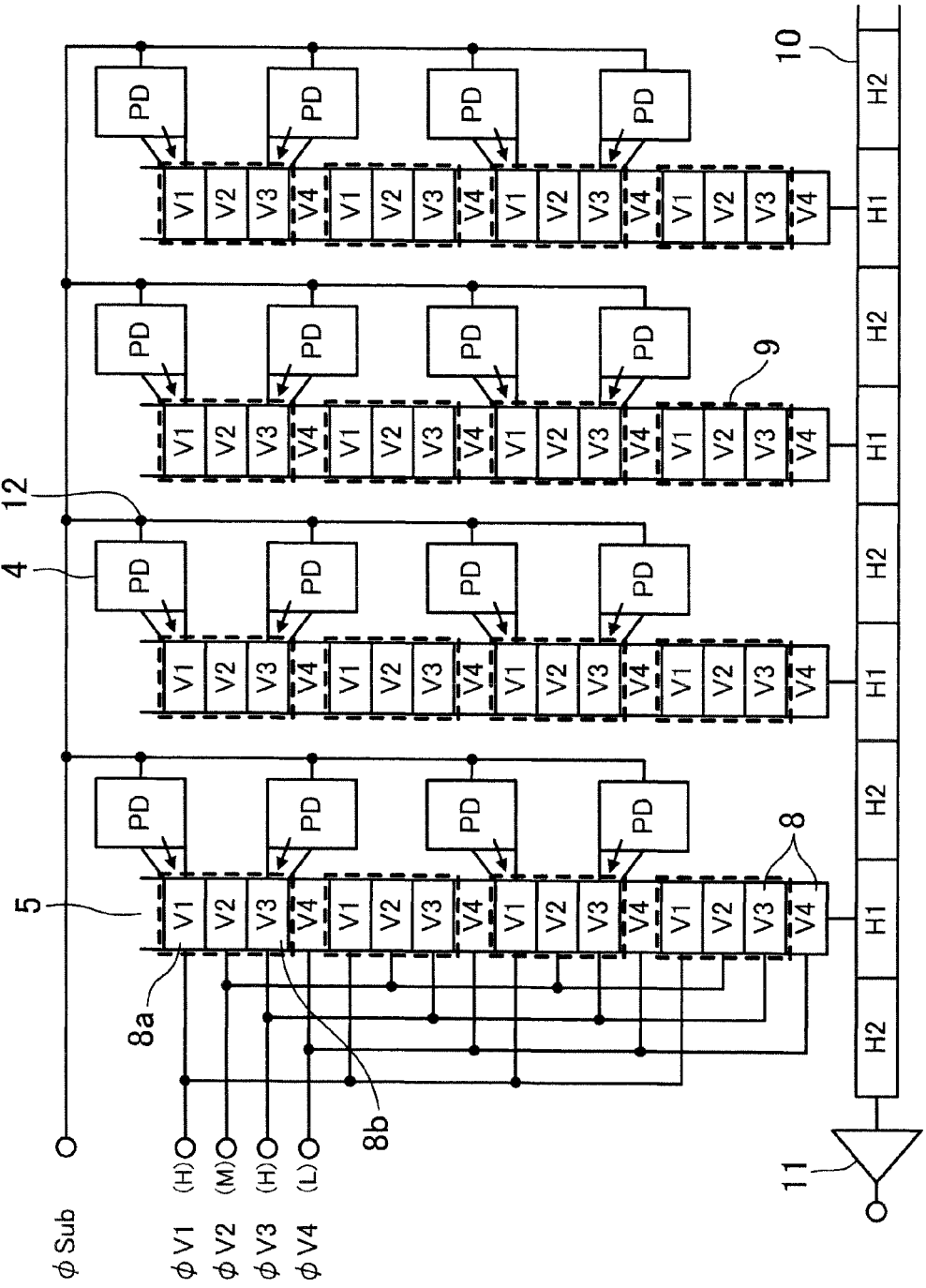
FIG. 18 is a diagram showing a configuration of a solid-state image capture device according to a second embodiment of the present disclosure.

FIG. 18 is a diagram showing a configuration of the solid-state image capture device of the second embodiment. This solid-state image capture device is different from that of the first embodiment of FIG. 15 in the electrode for reading signal charge from the photoelectric conversion unit 4 into the vertical transfer unit 5 corresponding to the photoelectric conversion unit 4, specifically in that the read electrodes of two adjacent pixels are closer to each other than in the solid-state image capture device of the first embodiment of FIG. 15. In FIG. 15, a read electrode is provided every four vertical transfer electrodes. In the solid-state image capture device of this embodiment of FIG. 18, a read electrode 8a, 8b for signal charge of the photoelectric conversion unit 4 is provided every two vertical transfer electrodes, as indicated by $\phi V1$ and $\phi V3$.

Next, the timing of operation of the solid-state image capture device of this embodiment will be described with reference to FIGS. 19, 20A, and 20B. FIG. 19 shows example drive timings at which signal charge in two vertically adjacent pixels is added together within one frame period, and is different from FIG. 16 of the first embodiment in that pulses are simultaneously applied to $\phi V1$ and $\phi V3$.

Figure 20A:
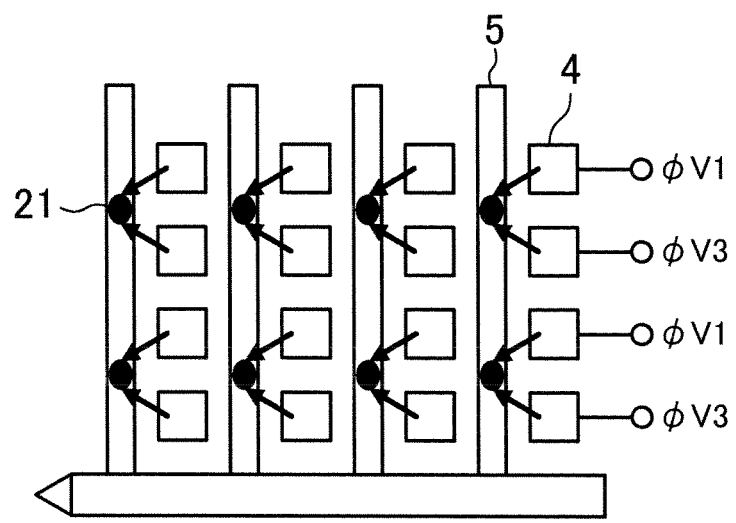
FIGS. 20A and 20B are diagrams schematically showing a flow of signal charge within one frame period in the solid-state image capture device of FIG. 18.
Figure 20B:
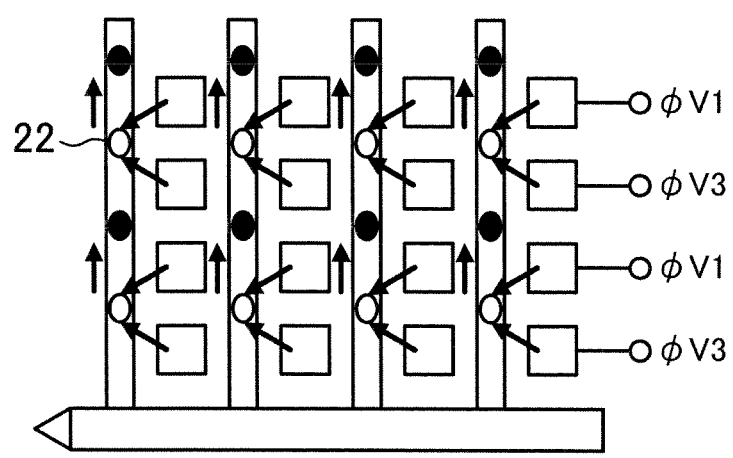

As shown in FIGS. 20A and 20B, a read pulse is applied to $\phi V1$ and $\phi V3$ simultaneously during an exposure period of illumination with infrared light, so that the signal charge 21 is read into the vertical transfer unit 5, and at the same time of the reading, the two pixel signals are added together in one signal packet. With this configuration, compared to the first embodiment, two pixel signals are added together, and therefore, a drive for vertical transfer by one pixel is not needed. In FIG. 18, an arrow projecting from the photoelectric conversion unit 4 indicates how, at this time, charge is read from the photoelectric conversion unit 4 into the vertical transfer unit 5.

The sum of the signal charge 21 is vertically transferred by one pixel in the opposite transfer direction (upward in FIGS. 20A and 20B), and after signal charge is drained from all pixels through $\phi$Sub, signal charge 22 accumulated during an exposure period Tb is read into another packet of the vertical transfer unit 5 by applying a read pulse to $\phi V1$ and $\phi V3$ simultaneously in the same manner that is previously performed, so that the sum of the signal charge 22 is obtained.

Thereafter, the signal charge 21 and the signal charge 22 are vertically transferred by one pixel in the forward direction to be returned to the original positions, i.e., the same positions as those of FIG. 20A. Although the signal charge 22 is not shown in FIG. 20A, an empty packet between the positions of the signal charge 21 corresponds to the position of the signal charge 22 as shown in FIG. 20B.

In the case of the drive timing of FIG. 19, a set of the turning on and off of infrared illumination and the series of drive of FIGS. 20A and 20B is performed two times within one frame period, and thereafter, outputting is performed.

As described above, according to the solid-state image capture device of the second embodiment, two adjacent pixels can be simultaneously read out, and therefore, it is easy to design drive timing, and in addition, a distance can be more precisely calculated. The solid-state image capture device of the second embodiment can also be used even in a distance measuring scheme in which error is likely to occur in distance measurement if there is a time lag between two signals to be added together, such a TOF distance measuring sensor, etc.

The order in which signals are output is the same as that of the first embodiment, and therefore, an existing signal processing system can be used. As a result, as with the first embodiment, the solid-state image capture device of this embodiment can replace a conventional solid-state image capture device, and can be easily handled.

Moreover, when it is desirable that signals be output from all pixels once per frame without the addition drive (all pixels are separately read out), reading is performed from φV1 and φV3 simultaneously while φV2 is at the low level as shown in FIG. 18, thereby reading signal charge accumulated in the photoelectric conversion unit 4 of each pixel into another packet, and therefore, signals can be output from all pixels. As a result, a single sensor can be used to capture a distance image and a normal image by changing drive schemes.

Figure 21A:
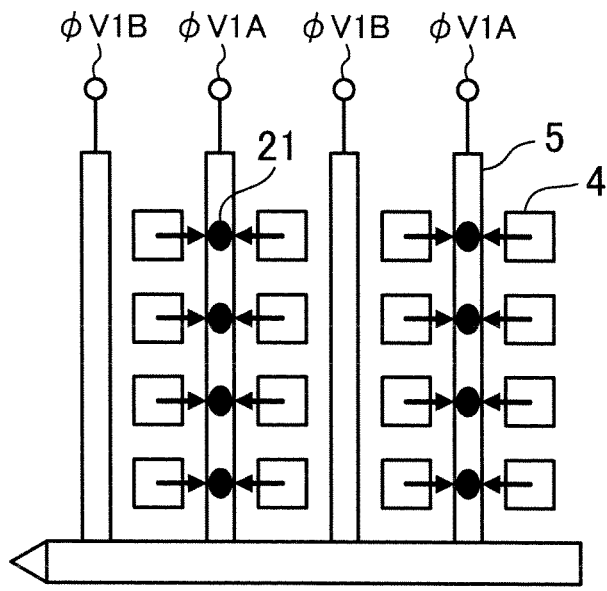
FIGS. 21A and 21B are diagrams schematically showing a flow of signal charge within one frame period in a variation of the solid-state image capture device of FIG. 18.
Figure 21B:
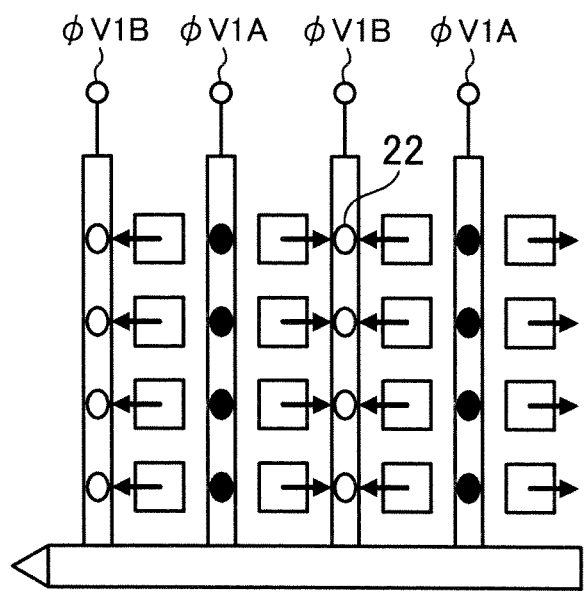

Note that, as shown in FIGS. 21A and 21B, it is also effective to add two pixels adjacent to each other in the horizontal direction together. With this technique, addition can be performed in the vertical transfer unit 5 only by reading two pixels adjacent to each other in the horizontal direction through a single common read electrode φV1A or φV1B. Compared to the solid-state image capture device of FIG. 18 in which reading needs to be performed from the end of the photoelectric conversion unit 4, the photoelectric conversion unit 4 can be more easily read out, and it is easier to design the solid-state image capture device, and read electrodes can be arranged close to the center of the photoelectric conversion unit 4, and therefore, the minimum read voltage can be set to be low.

<<Third Embodiment>>

A solid-state image capture device according to a third embodiment of the present disclosure will now be described, focusing on a difference from the first embodiment. The solid-state image capture device of the third embodiment is different from that of the first embodiment in that the read electrodes φV1A and φV1B are arranged in a checkerboard pattern, i.e., the read electrodes φV1A and φV1B alternate in both the horizontal and vertical directions. Nevertheless, the solid-state image capture device of the third embodiment is intended to provide a structure in which signal charge in pixels adjacent to each other in the vertical direction can be added together, as with that of the first embodiment. The difference from the first embodiment will be mainly described, and the same points will not be described.

Figure 22:
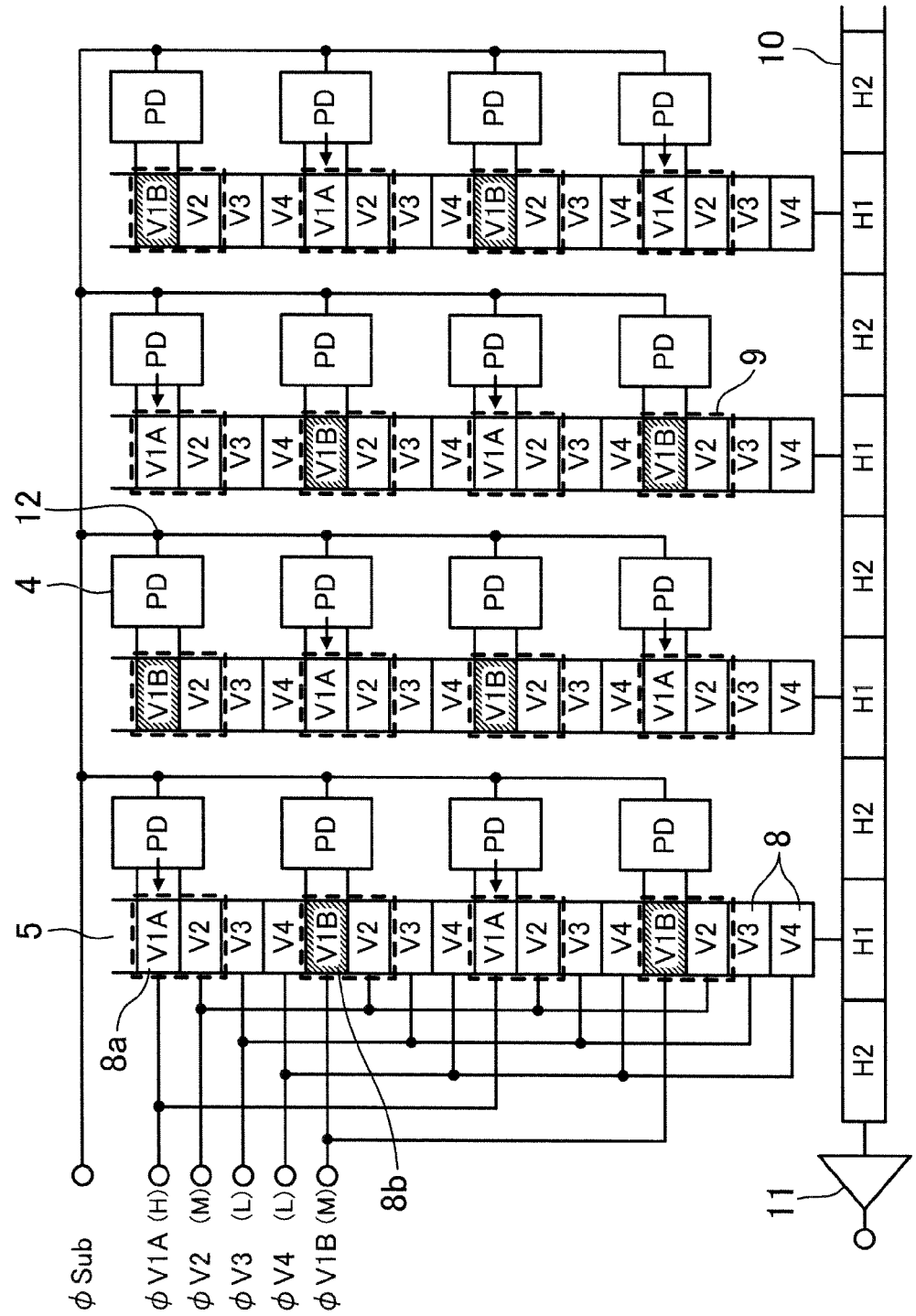
FIG. 22 is a diagram showing a configuration of a solid-state image capture device according to a third embodiment of the present disclosure.
Figure 23:
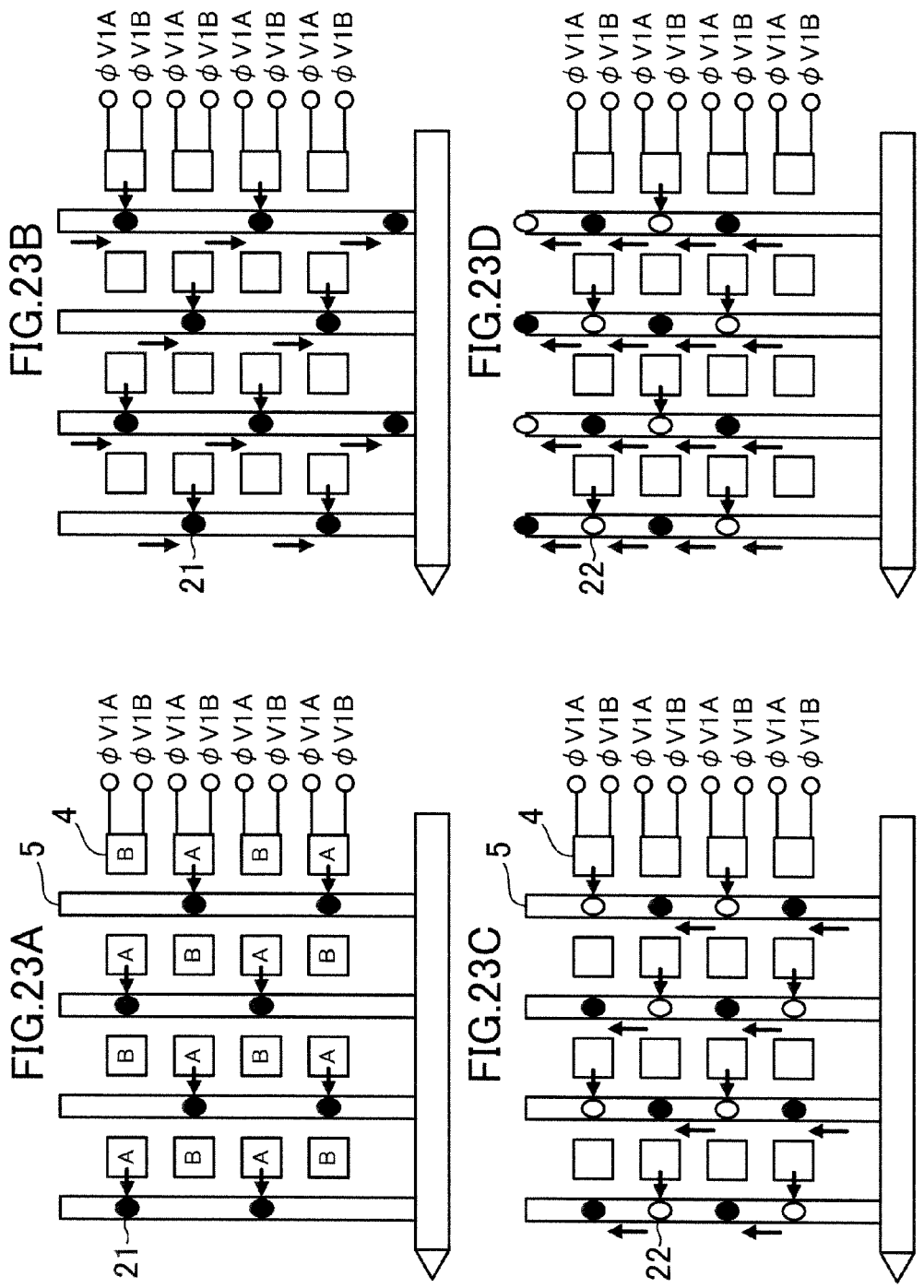
FIGS. 23A, 23B, 23C, and 23D are diagrams schematically showing a flow of signal charge within one frame period in the solid-state image capture device of FIG. 22.

FIG. 22 is a diagram showing a configuration of the solid-state image capture device of the third embodiment. This solid-state image capture device is different from that of the first embodiment of FIG. 15 in the electrode which is used to read signal charge from the photoelectric conversion unit 4 into the vertical transfer unit 5 corresponding to the photoelectric conversion unit 4. Specifically, in the solid-state image capture device of the first embodiment of FIG. 15, if one pixel has a read electrode φV1A, another pixel right adjacent to that pixel also has a read electrode φV1A. On the other hand, in the solid-state image capture device of the third embodiment of FIG. 22, if one pixel has a read electrode φV1A, another pixel right adjacent to that pixel has a read electrode φV1B. Still another pixel right adjacent to that pixel having a read electrode φV1B has a read electrode φV1A. In the immediately lower row, conversely, the leftmost pixel has a read electrode φV1B, and a pixel right adjacent to that pixel has a read electrode φV1A. Thus, a set of pixels having a read electrode φV1A and a set of pixels having a read electrode φV1B are each arranged in a checkerboard pattern.

Next, the timing of operation of the solid-state image capture device of FIG. 22 will be described with reference to FIGS. 23A, 23B, 23C, and 23D. Although the third embodiment is different from the first embodiment in that the read electrodes are arranged in a checkerboard pattern, the drive timing itself is the same as that of the first embodiment shown in FIG. 16.

As shown in FIGS. 23A-23D, signal charge 21 obtained in the presence of illumination with infrared light during the exposure period, and signal charge 22 obtained in the presence of ambient light without illumination with infrared light during the exposure period, are output in a checkerboard pattern. Note that, in FIG. 23A, for ease of understanding, a pixel read from the photoelectric conversion unit 4 through φV1A is indicated by "A," and a pixel read from the photoelectric conversion unit 4 through φV1B is indicated by "B."

The subsequent flow is the same as that of the first embodiment shown in FIGS. 17A-17D. Specifically, as shown in FIGS. 23A-23D, the signal charge 21 obtained in the presence of illumination of infrared light is read out, and next, the signal charge 22 obtained in the presence of only ambient light is read out. In FIG. 22, an arrow projecting from the photoelectric conversion unit 4 indicates how, at the time of FIG. 23A, charge is read from the photoelectric conversion unit 4 into the vertical transfer unit 5.

In the case of the drive timing of the first embodiment of FIG. 16, a set of the turning on and off of infrared illumination and the series of drive of FIGS. 23A-23D is performed two times within one frame period, and thereafter, outputting is performed during the transfer period Tc.

As described above, according to the solid-state image capture device of the third embodiment, signal charge obtained without illumination with infrared light is subtracted from signal charge obtained in the presence of illumination with infrared light, and therefore, the resolution in the subtraction direction is reduced by a half. Nevertheless, the checkerboard pattern of signals after the subtraction allows for signal processing capable of compensating for the resolution. As a result, higher-precision distance measurement than that of conventional distance measuring sensors can be achieved using the same number of pixels.

Note that, as in the first embodiment, a normal image can also be captured if all pixels are read out by a typical drive.

<<Fourth Embodiment>>

A solid-state image capture device according to a fourth embodiment of the present disclosure will now be described, focusing on a difference from the second embodiment. The solid-state image capture device of the fourth embodiment is different from that of the second embodiment in that different columns have different pairs of two pixels to be simultaneously added together, and in connection with this, in the configuration of read electrodes. Nevertheless, the solid-state image capture device of the fourth embodiment is intended to provide a structure in which signal charge in pixels adjacent to each other in the vertical direction can be added together, as with that of the second embodiment. The difference from the second embodiment will be mainly described, and the same points will not be described.

Figure 24:
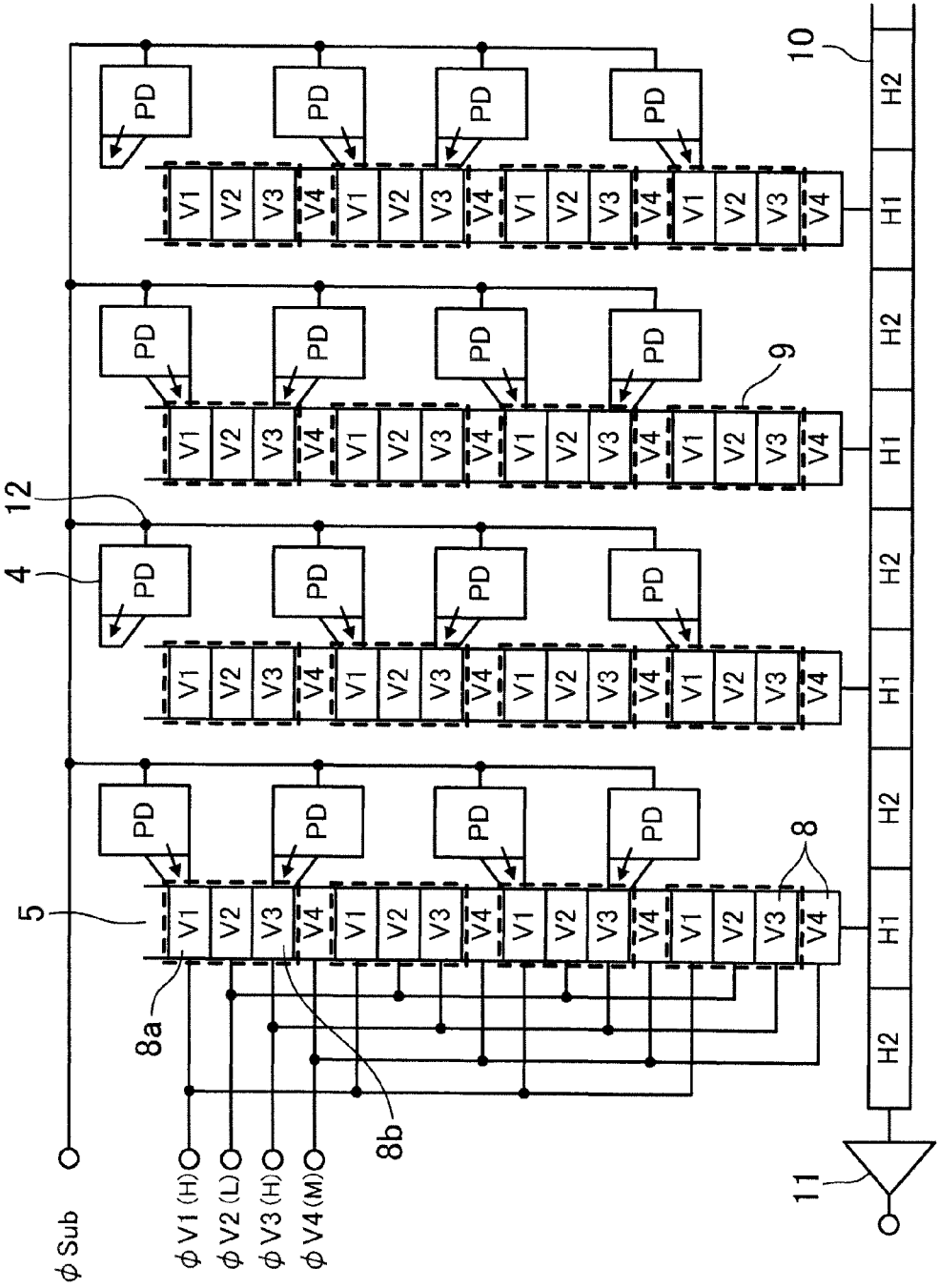
FIG. 24 is a diagram showing a configuration of a solid-state image capture device according to a fourth embodiment of the present disclosure.

FIG. 24 is a diagram showing a configuration of the solid-state image capture device of the fourth embodiment. This solid-state image capture device is different from that of the second embodiment of FIG. 18 in that different columns have different electrodes which are used to read signal charge from the photoelectric conversion unit 4 to the vertical transfer unit 5 corresponding to the photoelectric conversion unit 4. For example, in the solid-state image capture device of FIG. 18, the leftmost and lowest pixel is read out through φV3, and a pixel right adjacent to that pixel is also read out through φV3. On the other hand, in the solid-state image capture device of the fourth embodiment of FIG. 24, while the leftmost and lowest pixel is read out through φV3, a pixel right adjacent to that pixel is read out through φV1. Moreover, a pixel right adjacent to that second pixel is read out through φV3.

The solid-state image capture device of the fourth embodiment is different from that of the second embodiment only in that different columns have different arrangements of read electrodes. Therefore, the drive timing of the solid-state image capture device of the fourth embodiment is the same as that of the second embodiment of FIG. 19.

Figure 25A:
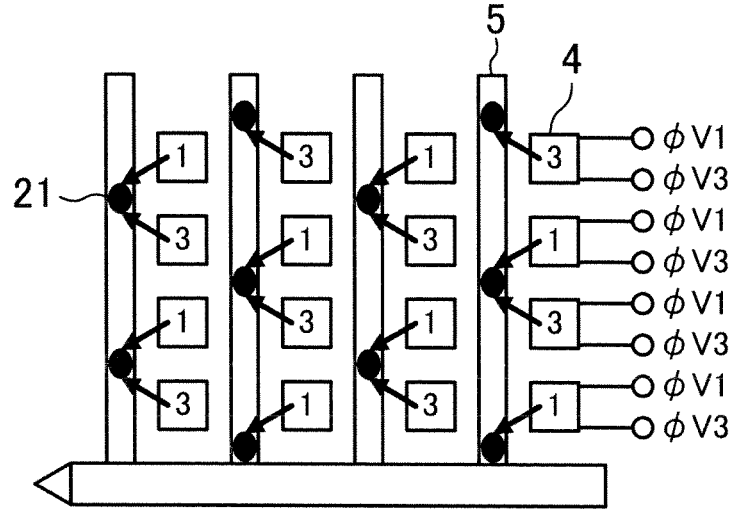
FIGS. 25A and 25B are diagrams schematically showing a flow of signal charge within one frame period in the solid-state image capture device of FIG. 24.
Figure 25B:
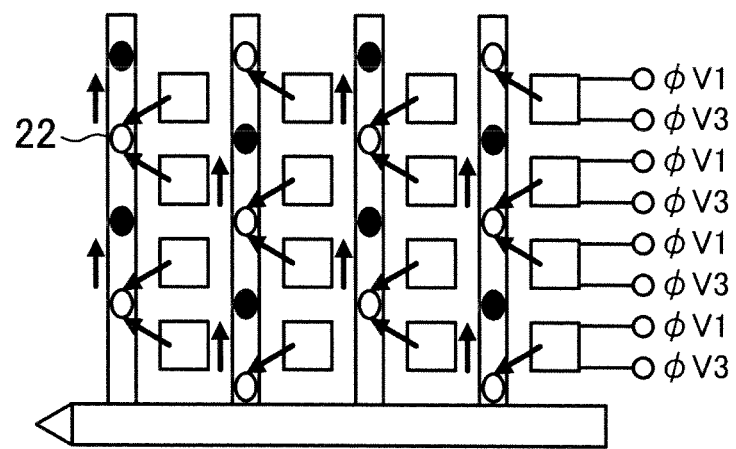

Next, the timing of operation of the solid-state image capture device of this embodiment will be described with reference to FIGS. 25A and 25B. As shown in FIGS. 25A and 25B, signal charge 21 obtained in the presence of illumination with infrared light during the exposure period, and signal charge 22 obtained in the presence of ambient light without illumination with infrared light during the exposure period, are output in a checkerboard pattern. Note that, in FIG. 25A, for ease of understanding, a pixel read from the photoelectric conversion unit 4 through φV1 is indicated by "1," and a pixel read from the photoelectric conversion unit 4 through φV3 is indicated by "3."

The subsequent flow is the same as that of the second embodiment shown in FIGS. 20A and 20B. Specifically, as shown in FIGS. 25A and 25B, the signal charge 21 obtained in the presence of illumination of infrared light is read out, and next, after the signal charge 21 is vertically transferred, the signal charge 22 obtained in the presence of only ambient light is read out. In FIG. 24, an arrow projecting from the photoelectric conversion unit 4 indicates how, at the time of FIG. 25A, charge is read from the photoelectric conversion unit 4 into the vertical transfer unit 5.

In the case of the drive timing of the second embodiment of FIG. 19, a set of the turning on and off of infrared illumination and the series of drive of FIGS. 25A and 25B is performed two times within one frame period, and thereafter, outputting is performed during the transfer period Tc.

As described above, according to the solid-state image capture device of the fourth embodiment, signal charge obtained without illumination with infrared light is subtracted from signal charge obtained in the presence of illumination with infrared light, and therefore, the resolution in the subtraction direction is reduced by a half. Nevertheless, the checkerboard pattern of signals after the subtraction allows for signal processing capable of compensating for the resolution. As a result, higher-precision distance measurement than that of conventional distance measuring sensors can be achieved using the same number of pixels.

Moreover, as in the second embodiment, two adjacent pixels are simultaneously read out, and therefore, it is easier to design drive timing. In addition, the fourth embodiment is particularly effective for a TOF distance measuring sensor due to the simultaneous addition. For example, the fourth embodiment is also effective for the second TOF technique of FIGS. 10A and 10B in which the distance is calculated at a rise portion of a light source pulse, and the third TOF technique of FIGS. 12A and 12B in which the distance is calculated at a fall portion of a light source pulse.

In the foregoing, the addition drive has been mainly described. When it is desirable that signals be output from all pixels once per frame without the addition drive of two adjacent pixels (all pixels are separately read out), reading is performed from φV1 and φV3 simultaneously while φV2 is at the low level as in the second embodiment, thereby reading signal charge accumulated in the photoelectric conversion unit 4 of each pixel into another packet, and therefore, signals can be output from all pixels. As a result, a single sensor can be used to capture a distance image and a normal image by changing drive schemes.

<<Fifth Embodiment>>

A solid-state image capture device according to a fifth embodiment of the present disclosure will now be described, focusing on a difference from the fourth embodiment. The solid-state image capture device of the fifth embodiment is different from that of the fourth embodiment in the combination of two pixels which are simultaneously added together, i.e., in that two pixels in the horizontal direction are added together in the fifth embodiment, and in connection with this, in the configuration of read electrodes. Nevertheless, the solid-state image capture device of the fifth embodiment is intended to provide a structure in which signal charge in adjacent pixels can be added together, as with that of the fourth embodiment. The difference from the fourth embodiment will be mainly described, and the same points will not be described.

Figure 26:
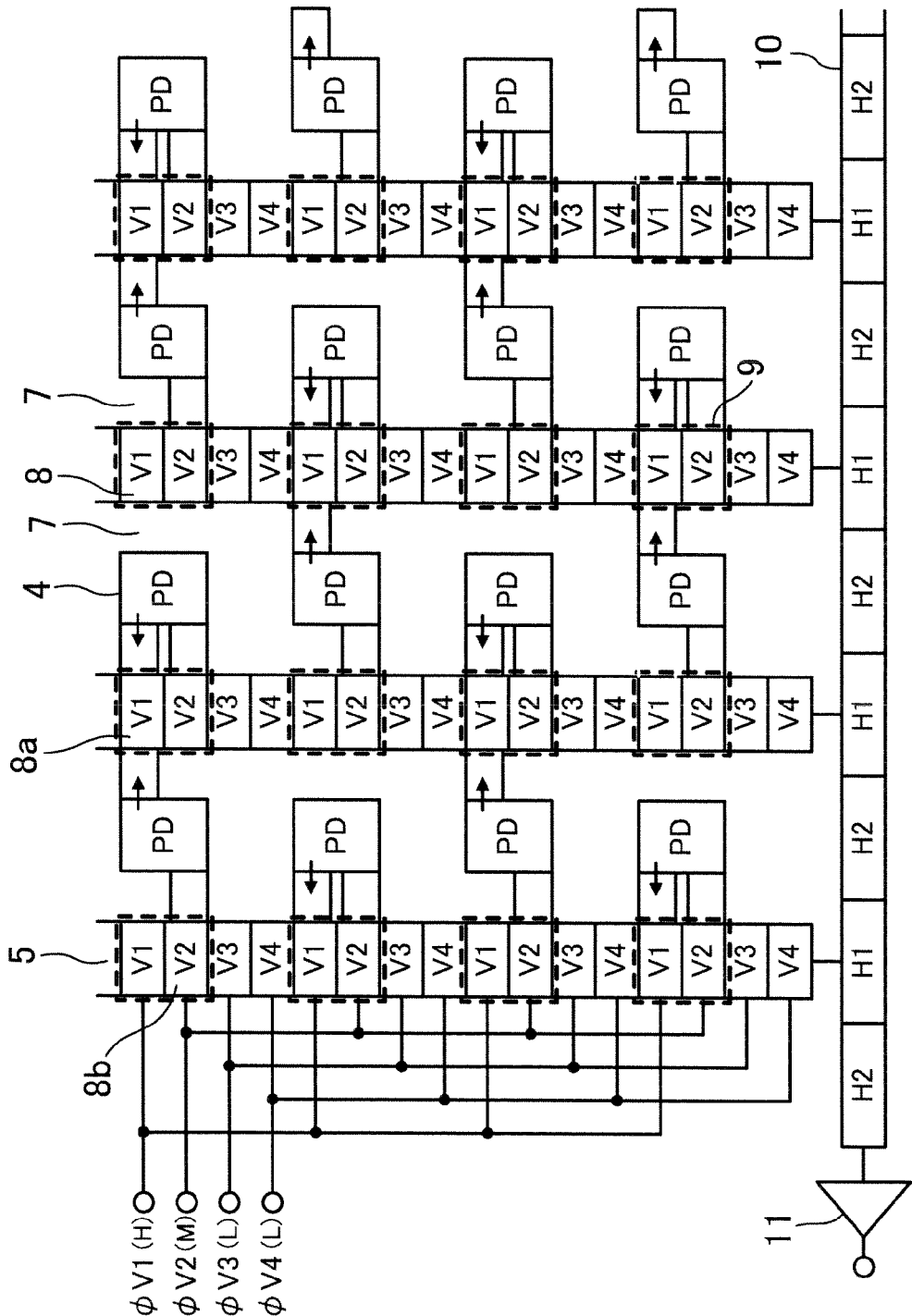
FIG. 26 is a diagram showing a configuration of a solid-state image capture device according to a fifth embodiment of the present disclosure.

FIG. 26 is a diagram showing a configuration of the solid-state image capture device of the fifth embodiment. This solid-state image capture device is different from that of the fourth embodiment of FIG. 24 in that electrodes for reading signal charge from the photoelectric conversion unit 4 into the vertical transfer unit 5 corresponding to the photoelectric conversion unit 4 can be used to read the photoelectric conversion units 4 adjacent to each other in the vertical transfer unit 5 simultaneously.

Note that the vertical transfer electrode φV1 is provided for all pixels, and therefore, portions in which pixels on both sides of the vertical transfer electrode 8 are not allowed to be read out, and portions in which pixels on both sides of the vertical transfer electrode 8 are allowed to be read out, are arranged in a checkerboard pattern as shown in FIG. 26. Therefore, of φV1, a channel stop region 7 is formed on both sides of the vertical transfer electrode 8 through which signal charge is not read out so that when a read pulse is applied to φV1, signal charge is not read out into the vertical transfer unit 5. Conversely, of φV1, the channel stop region 7 is not provided on both sides of the vertical transfer electrode 8a through which signal charge does not need to be read out so that signal charge can be easily read out. Although, for the sake of simplicity, for example, φSub shown in FIG. 24 which is a diagram showing a configuration of the solid-state image capture device of the fourth embodiment is not shown in FIG. 26, the solid-state image capture device of the fifth embodiment has a similar configuration.

Figure 28A:
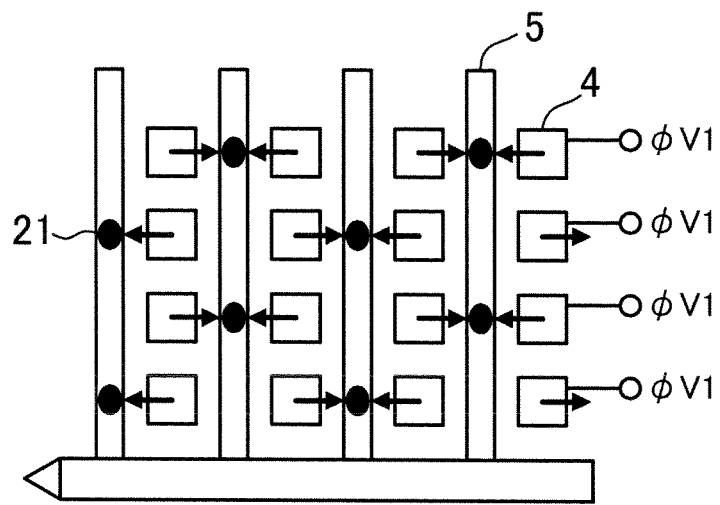
FIGS. 28A, 28B, and 28C are diagrams schematically showing a flow of signal charge within one frame period in the solid-state image capture device of FIG. 26.
Figure 28B:
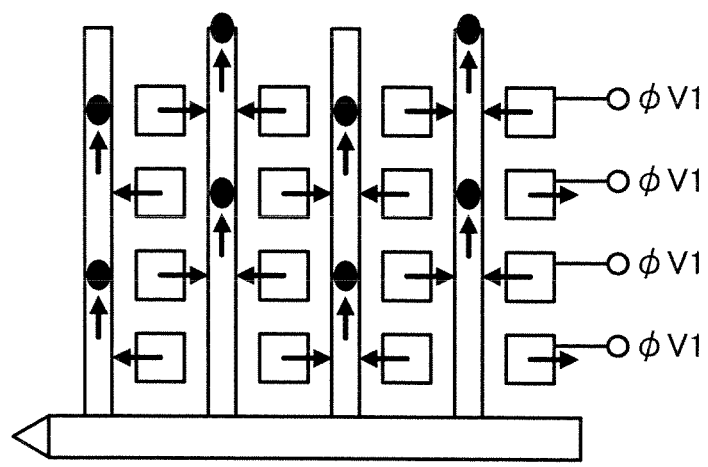
Figure 28C:
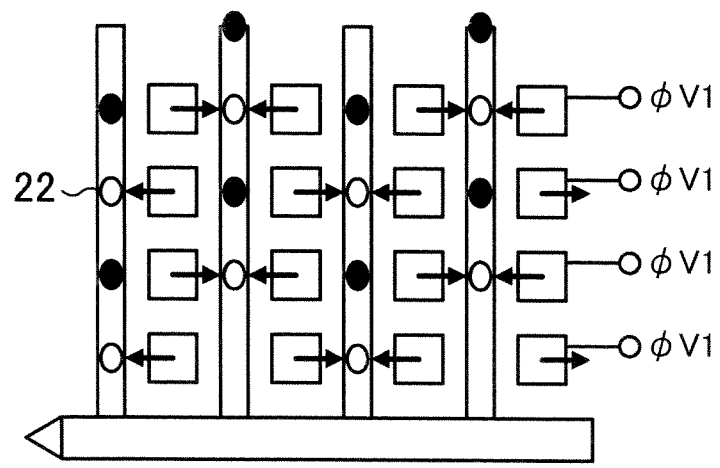

Next, the timing of operation of the solid-state image capture device of this embodiment will be described with reference to FIGS. 27 and 28A, 28B, and 28C. FIG. 27 shows example drive timings at which two horizontally adjacent pixels are simultaneously added together within one frame period. FIGS. 28A-28C schematically show how charge is added together and charge is transferred.

Initially, as shown in FIG. 27, as in the solid-state image capture device of the fourth embodiment, both the signal charge 21 obtained in the presence of illumination with infrared light and the signal charge 22 obtained in the presence of only ambient light, are obtained during each frame period. The fifth embodiment is different from the fourth embodiment in that two adjacent pixels can be binned and read out only by applying a read pulse to φV1.

As shown in an exposure period Ta of FIG. 27, signal charge caused by illumination with infrared light is accumulated, a read pulse is applied to φV1, and as shown in FIG. 28A, the signal charge 21 in a checkerboard pattern is read out to capture an image. In FIG. 26, an arrow projecting from the photoelectric conversion unit 4 indicates how, at this time, charge is read from the photoelectric conversion unit 4 into the vertical transfer unit 5. Thereafter, as shown in FIG. 28B, the signal charge 21 read from one pixel is transferred to another pixel adjacent to that pixel in the opposite transfer direction (upward in FIGS. 28A and 28B).

Next, after φSub is applied so that signal charge is drained from all pixels, signal charge caused in the presence of only ambient light without illumination with infrared light is accumulated in the photoelectric conversion unit 4 during the exposure period Tb of FIG. 27. Thereafter, at the end of the exposure period Tb, a read pulse is applied to φV1 so that, as shown in FIG. 28C, the signal charge 22 is read out into the vertical transfer unit 5 in a checkerboard pattern. At this time, the signal charge 22 is read into another packet so that the signal charge 22 is not added to the signal charge 21 previously caused by illumination with infrared light.

Thereafter, signal charge read from one pixel into the vertical transfer unit 5 is transferred by one pixel in the forward transfer direction (downward in FIGS. 28A and 28B) opposite to the previous direction, and the exposure period Ta of FIG. 27 begins again. The subsequent flow is the same as that of FIGS. 28A-28C. Specifically, in the case of the drive timing of FIG. 27, a set of the turning on and off of infrared illumination and the series of drive of FIGS. 28A-28C is performed two times, and thereafter, outputting is performed during the transfer period Tc.

As described above, according to the solid-state image capture device of the fifth embodiment, if two pixels adjacent to each other in the horizontal direction are only read out through the common read electrode φV1, signal charge from the two pixels can be added together in the vertical transfer unit 5. Therefore, compared to the solid-state image capture device of the fourth embodiment of FIG. 24 in which it is necessary to read from the end of the photoelectric conversion unit 4, the solid-state image capture device of the fifth embodiment can have an electrode structure in which signal charge can be read out in the vicinity of the center of the photoelectric conversion unit 4. Therefore, signal charge can be more easily read from the photoelectric conversion unit 4, and it is easier to design the solid-state image capture device of the fifth embodiment, and the minimum read voltage can be reduced.

In the foregoing, the addition drive has been mainly described. When it is desirable that signals be output from all pixels once per frame without the addition drive of two adjacent pixels (all pixels are separately read out), the solid-state image capture device may be designed so that reading can be performed through φV2 which is the vertical transfer electrode 8b which also serves as a read electrode, whereby signals can be output from all pixels by reading signal charge accumulated in the photoelectric conversion unit 4 of each pixel into another packet. As a result, a single sensor can be used to capture a distance image and a normal image by changing drive schemes.

Figure 29:
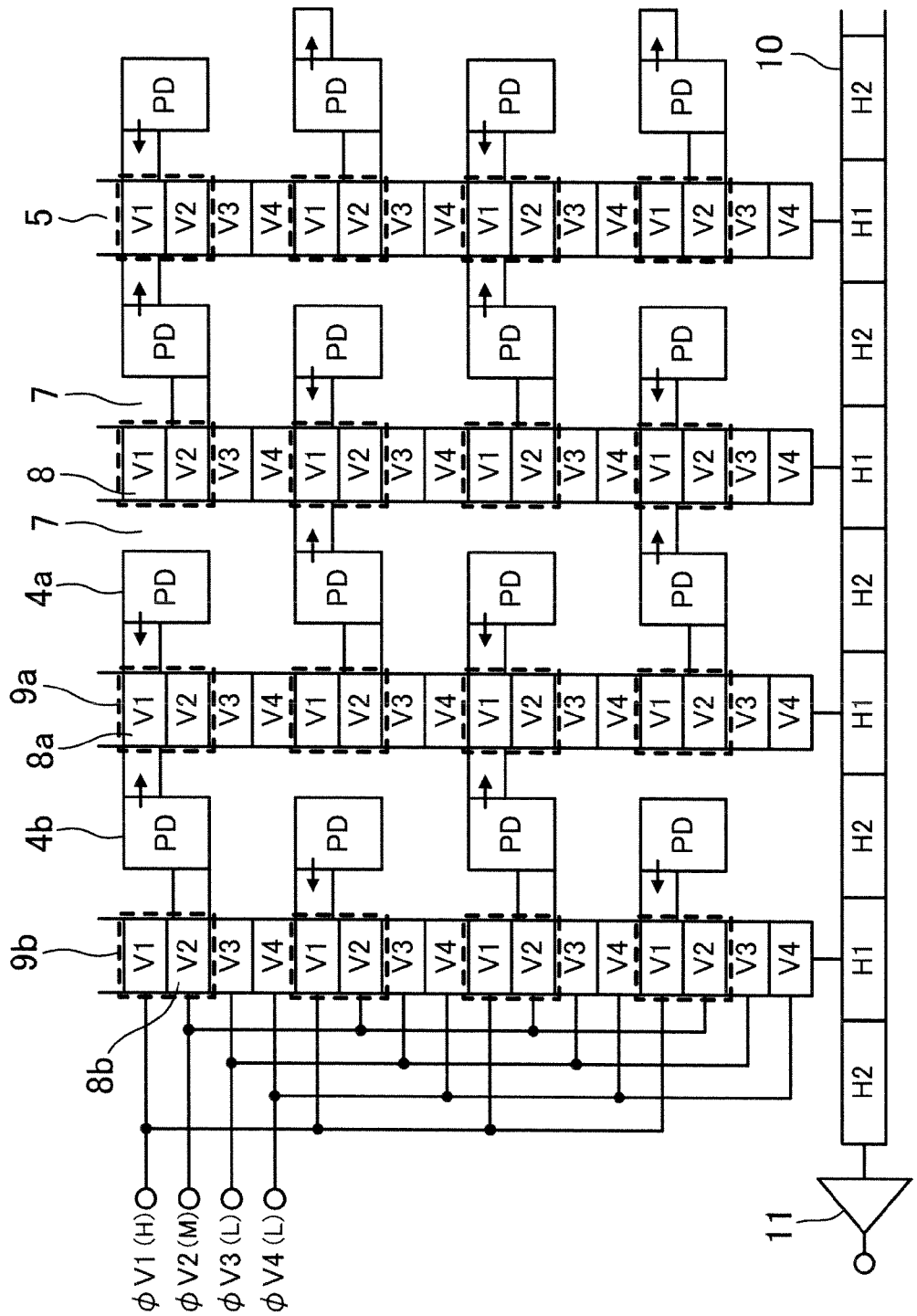
FIG. 29 is a diagram showing a configuration of a variation of the solid-state image capture device of FIG. 26.

In another embodiment, a solid-state image capture device shown in FIG. 29 may be provided. In the solid-state image capture device of FIG. 29, unlike the solid-state image capture device of FIG. 26, the vertical transfer electrodes φV2 are arranged in a checkerboard pattern, and therefore, not all pixels are read out. As a result, although two adjacent pixels are binned in the same drive scheme, all pixels are read out as follows: charge is first read from a photoelectric conversion unit 4b through φV2 which is the read electrode 8b into a signal packet 9b, and thereafter, a read pulse is applied to φV1, so that charge is read from a photoelectric conversion unit 4a into a signal packet 9a. At this time, charge is also read from the photoelectric conversion unit 4b into the signal packet 9a. If the time lag from the time when reading was previously performed through φV2 is small, the amount of a signal read from the photoelectric conversion unit 4b is considerably small, i.e., negligible. With the configuration of FIG. 29, only one electrode is used per direction to read signal charge from the photoelectric conversion unit 4 into the vertical transfer unit 5. In this case, it is easier to design the read unit than when two electrodes are used per direction as shown in FIG. 26.

Note that two adjacent pixels are read out simultaneously, and therefore, the fifth embodiment is particularly effective for a TOF distance measuring sensor. For example, the fifth embodiment is effective for the second TOF technique of FIGS. 10A and 10B in which the distance is calculated at a rise portion of a light source pulse, and the third TOF technique of FIGS. 12A and 12B in which the distance is calculated at a fall portion of a light source pulse.

<<Sixth Embodiment>>

A solid-state image capture device according to a sixth embodiment of the present disclosure will now be described, focusing on a difference from the fifth embodiment. The solid-state image capture device of the sixth embodiment is different from that of the fifth embodiment in the number of drive phases, although the electrode configuration of the vertical transfer unit is the same, and in connection with this, in the number of signal packets which can be held in the vertical transfer unit. Nevertheless, the solid-state image capture device of the sixth embodiment is intended to provide a structure in which signal charge in adjacent pixels can be added together, as with that of the fifth embodiment. The difference from the fifth embodiment will be mainly described, and the same points will not be described.

Figure 30:
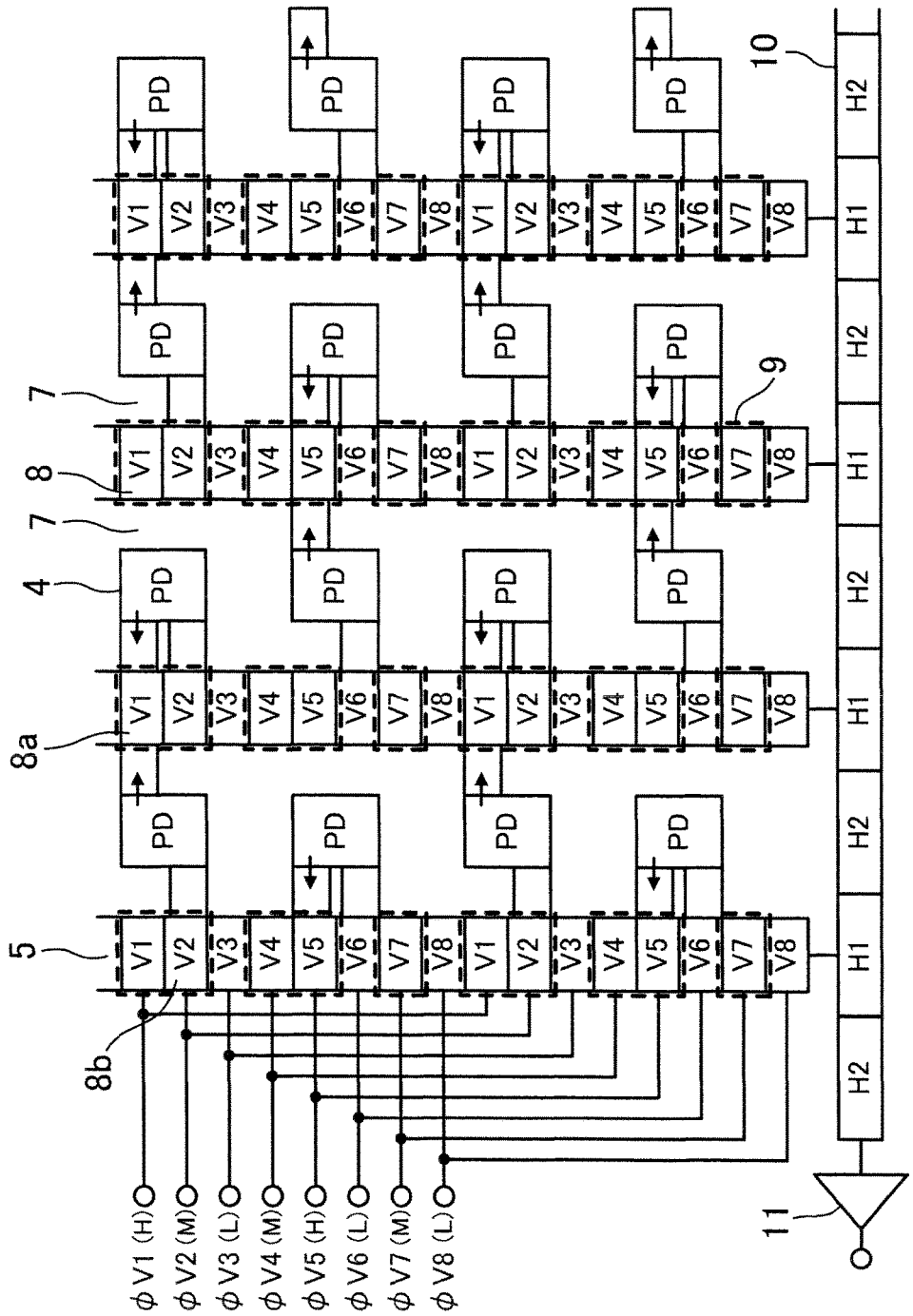
FIG. 30 is a diagram showing a configuration of a solid-state image capture device according to a sixth embodiment of the present disclosure.

FIG. 30 is a diagram showing a configuration of the solid-state image capture device of the sixth embodiment. This solid-state image capture device is different from that of the fifth embodiment of FIG. 26 in that the vertical transfer unit 5 performs eight-phase drive, although there are four electrodes for each pixel as in the fifth embodiment. While, in the fifth embodiment, only one packet can be held in each pixel, i.e., two packets in each set of two pixels, as shown in FIG. 26, three packets can be held in each set of two pixels in the configuration of FIG. 30 which allows for the eight-phase drive.

Although the number of signal packets which are held is increased, there is not a pixel mismatch when an ambient light image is subtracted from the infrared illumination image, as in the fifth embodiment. Also, as in the fifth embodiment, the resolution can be increased, and signals of all pixels can be used.

Figure 32A:
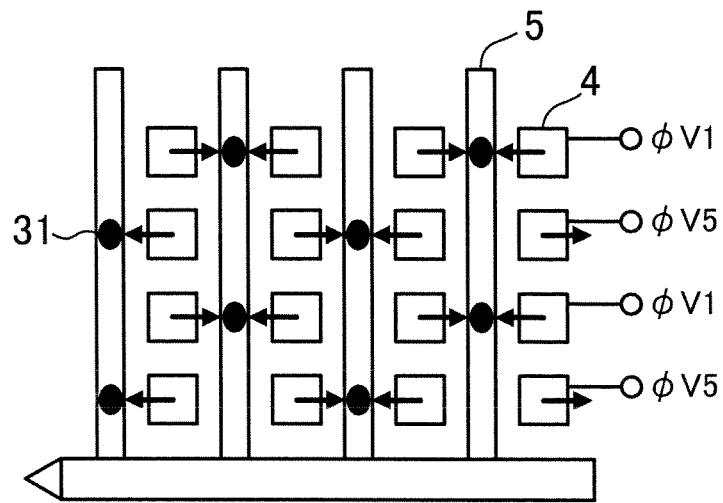
FIGS. 32A, 32B, and 32C are diagrams schematically showing a flow of signal charge within one frame period in the solid-state image capture device of FIG. 30.
Figure 32B:
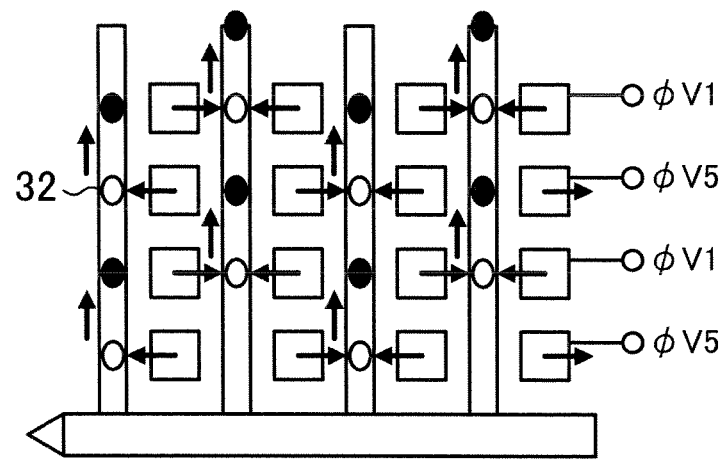
Figure 32C:
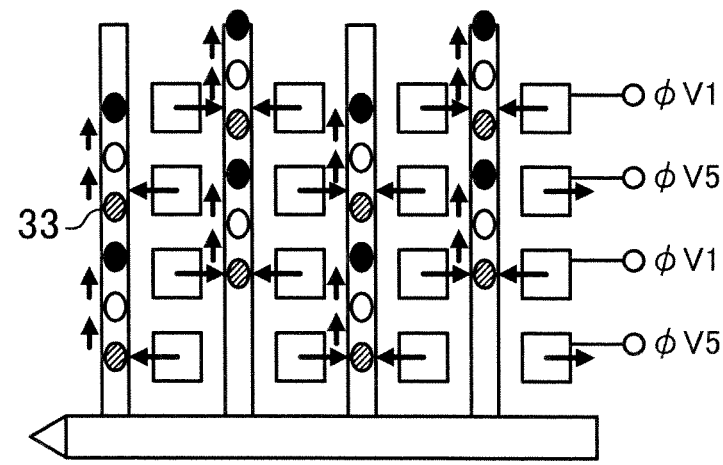

Next, the timing of operation of the solid-state image capture device of this embodiment will be described with reference to FIGS. 31 and 32A, 32B, and 32C. FIG. 31 shows example drive timings at which two horizontally adjacent pixels are simultaneously added together within one frame period. FIGS. 32A-32C schematically show how charge is added together and charge is transferred.

Initially, as shown in FIG. 31, unlike the solid-state image capture device of the fifth embodiment, three types of signal charge, i.e., signal charge 31 caused by reflected light from an object in the presence of illumination with infrared light, signal charge 32 caused by reflected light from the object in the presence of illumination with infrared light at a timing different from that of the signal charge 31, and signal charge 33 caused in the presence of only ambient light, are obtained within each frame period.

As shown in an exposure period Ta of FIG. 31, signal charge caused by illumination with infrared light is accumulated, a read pulse is applied to $\phi V1$ and $\phi V5$, and as shown in FIG. 32A, the signal charge 31 in a checkerboard pattern is read out. In FIG. 30, an arrow projecting from the photoelectric conversion unit 4 indicates how, at this time, charge is read from the photoelectric conversion unit 4 into the vertical transfer unit 5. Thereafter, as shown in FIG. 32B, the read signal charge 31 is transferred in the opposite transfer direction (upward in FIGS. 32A-32C). In this case, unlike the foregoing embodiments, only an amount of charge corresponding to one or two pixels is transferred instead of all the charge held in one pixel.

Next, as shown in an exposure period Tb of FIG. 31, infrared light is emitted at a timing different from the exposure period Ta, and charge accumulated in the photoelectric conversion unit 4 is read as the signal charge 32 into the vertical transfer unit 5 without being mixed with the signal charge 31 as shown in FIG. 32B.

Moreover, as in the foregoing, signals corresponding two or three electrodes are transferred, and as shown in an exposure period Td of FIG. 31, signal charge obtained in the presence of only ambient light without illumination with infrared light is accumulated in the photoelectric conversion unit 4, and as shown in FIG. 32C, the accumulated signal charge is read as the signal charge 33 into another packet in the vertical transfer unit 5 without being added to the signal charge 31 or the signal charge 32.

Thereafter, signal charge read from one pixel into the vertical transfer unit 5 is transferred by one pixel in the forward transfer direction (downward in FIGS. 32A-32C) opposite to the previous direction, and the exposure period Ta of FIG. 31 begins again. The subsequent flow is the same as that of FIGS. 32A-32C. Specifically, in the case of the drive timing of FIG. 31, a set of the turning on and off of infrared illumination and the series of drive of FIGS. 32A-32C is performed two times, and thereafter, outputting is performed during the transfer period Tc.

According to the solid-state image capture device of the sixth embodiment, although the solid-state image capture device of the sixth embodiment has the same electrode configuration as that of the solid-state image capture device of the fifth embodiment, the number of types of signal charge accumulated in the vertical transfer unit 5 can be increased by only changing the number of drive phases. The number of drive phases can be changed by only changing the way of connecting a bus line provided in the vicinity of a pixel portion to the vertical transfer electrode, without changing the layout of the pixel portion. The design can be easily changed.

In the solid-state image capture device of this embodiment, three different types of signal charge can be accumulated, and therefore, the solid-state image capture device is suitable for the fourth TOF technique of FIGS. 14A and 14B in which the ambient light component BG is removed, and therefore, the accuracy of a measured distance can be improved. Note that the sixth embodiment is effective for the second TOF technique of FIGS. 10A and 10B in which the distance is calculated at a rise portion of a light source pulse, and the third TOF technique of FIGS. 12A and 12B in which the distance is calculated at a fall portion of a light source pulse.

As in the fifth embodiment, all pixels can be read out using $\phi V2$. As a result, a single sensor can be used to capture a distance image and a normal image by changing drive schemes.

As another form of the embodiment of FIG. 30, pixels which are read out through $\phi V2$ may be arranged in a checkerboard pattern as in the fifth embodiment of FIG. 29, whereby the read portion can be easily designed.

In the foregoing, the first to sixth embodiments of the present disclosure have been described. The present disclosure is not intended to be limited to these embodiments. Various changes or modifications can be made to these embodiments by those skilled in the art without departing the scope of the present disclosure. Combinations of elements of different embodiments are meant to be within the scope of the present disclosure.

For example, in the first to fifth embodiments, the vertical transfer unit is of the four-phase drive type. Alternatively, the same advantages can be obtained in the case of three-phase drive or five-phase drive. Although, in the sixth embodiment, the vertical transfer unit is of the eight-phase drive type, the same advantages can be obtained in the case of 10-phase drive, for example.

If the solid-state image capture devices of the first to sixth embodiments are used in the above stereo, pattern projection, or TOF distance measuring camera, the sensitivity and the pixel use rate are higher than when a conventional solid-state image capture device is used, and therefore, the power of illumination of infrared light or the exposure time can be reduced, resulting in a reduction in power consumption of the entire system.

The present disclosure can provide a higher-precision distance image with higher efficiency, and therefore, is applicable to an image capture device, such as particularly a distance measuring camera, etc.

What is claimed is:

1. An image capture device comprising:
    an infrared light source configured to illuminate an object with infrared light; and
    a solid-state image capture device including first pixels and second pixels adjacent to the respective corresponding first pixels, the first and second pixels being arranged in a matrix having a vertical and horizontal direction,
    wherein the solid-state image capture device includes:
        a photoelectric conversion device configured to convert incident light from the object into signal charge, a read electrode configured to read the signal charge from the photoelectric conversion device on a row-by-row basis, and a vertical transfer device including a plurality of electrodes and configured to read all pixels and transfer the signal charge in an upward column direction and a downward column direction, in the solid-state image capture device, there is a repetition of a first exposure period and a second exposure period within one frame scanning period, the vertical transfer device is configured so that during the first exposure period, the signal charge from the first pixel and the signal charge from the second pixel adjacent to the first pixel are added together in the vertical transfer device to produce first signal charge, and the vertical transfer device is further configured so that during the second exposure period, the signal charge from the first pixel and the signal charge from the second pixel adjacent to the first pixel are transferred without being added to the first signal charge in the vertical transfer device, and are added together in another packet to produce second signal charge.

2. The image capture device of claim 1, wherein
the first and second pixels alternate in each row, and
the signal charge from the first pixel and the signal charge from the second pixel are added together, the first and second pixels being adjacent to each other in the vertical direction.

3. The image capture device of claim 2, wherein
after signal charge is read from the first pixel, the signal charge is vertically transferred by one pixel, and the signal charge is read from the second pixel, so that the signal charge from the first pixel and the signal charge from the second pixel are added together.

4. The image capture device of claim 2, wherein
a distance between the read electrode of the first pixel and the read electrode of the second pixel is smaller than one pixel interval, so that the signal charge is simultaneously read into a single packet.

5. An image capture device comprising:
an infrared light source configured to illuminate an object with infrared light; and
a solid-state image capture device including first pixels and second pixels adjacent to the respective corresponding first pixels, the first and second pixels being arranged in a matrix having a vertical and horizontal direction,
wherein the solid-state image capture device includes:
 a photoelectric conversion device configured to convert incident light from the object into signal charge,
 a read electrode configured to read the signal charge from the photoelectric conversion device on a row-by-row basis, and
 a vertical transfer device including a plurality of electrodes and configured to read all pixels and transfer the signal charge in an upward column direction and a downward column direction,
the first and second pixels alternate in each column,
in the solid-state image capture device, there is a repetition of a first exposure period and a second exposure period within one frame scanning period,
the vertical transfer device is configured so that during the first exposure period, the signal charge from the first pixel and the signal charge from the second pixel adjacent to the first pixel in the horizontal direction are added together in the vertical transfer device to produce first signal charge, and the vertical transfer device is further configured so that during the second exposure period, the signal charge from the first pixel and the signal charge from another second pixel adjacent to the first pixel in the horizontal direction are added together in the vertical transfer device at a position which is different from a position during the first exposure period, to produce second signal charge.

6. The image capture device of claim 5, wherein
the signal charge is read from the first and the second pixels into a single packet through the read electrode common to the first and second pixels.

7. The image capture device of claim 5, wherein
the signal charge is read from the first and the second pixels into a single packet through the separate read electrodes.

8. The image capture device of claim 3, wherein
the first and second pixels alternate in each column and row to form a checkerboard pattern, and
the signal charge from the first pixel and the signal charge from the second pixel are added together, the first and second pixels being adjacent to each other in the vertical direction.

9. The image capture device of claim 1, wherein
the first and second pixels alternate in each row and column to form a checkerboard pattern, and
the signal charge from the first pixel and the signal charge from the second pixel are added together, the first and second pixels being adjacent to each other in the horizontal direction.

10. The image capture device of claim 9, wherein
the vertical transfer device includes a plurality of electrodes for each pair of two pixels, and holds at least three signals in each pair of two pixels, and
the one frame scanning period includes a third exposure period during which the signal charge from the first pixel, and the signal charge from the second pixel adjacent to the first pixel, are added together in the vertical transfer device to produce third signal charge.

11. The image capture device of claim 1, wherein
the solid-state image capture device is a stereo distance measuring sensor,
during the first exposure period, an image of the object is captured while a space including the object is illuminated with the infrared light, to generate the first signal charge,
after the signal charge remaining in the photoelectric conversion devices of all pixels is drained off to a substrate, an image of the object is captured in the presence of only ambient light without illumination with the infrared light to produce the second signal charge during the second exposure period, and
the image capture device removes an ambient light component by subtracting the second signal charge from the first signal charge, and calculates a distance to the object by triangulation.

12. The image capture device of claim 1, wherein
the solid-state image capture device is a pattern projection distance measuring sensor,
during the first exposure period, an image of the object is captured while a space including the object is illuminated with the infrared light having a predetermined pattern, to generate the first signal charge, after the signal charge remaining in the photoelectric conversion devices of all pixels is drained off to a substrate, an image of the object is captured without illumination with the infrared light to produce the second signal charge during the second exposure period, and the image capture device removes an ambient light component by subtracting the second signal charge from the first signal charge, and calculates a distance to the object based on a difference in position between each projection pattern.

13. The image capture device of claim 1, wherein
the solid-state image capture device is a TOF distance measuring sensor,
during the first exposure period, while a space including the object is illuminated with the infrared light having a pulse form, reflected light received during a predetermined period of time is read from the photoelectric conversion device, to produce the first signal charge,
during the second exposure period, reflected light received during another predetermined period of time is read from the photoelectric conversion device to produce the second signal charge, and
the image capture device calculates a distance to the object based on a ratio of the first signal charge to the second signal charge.

14. The image capture device of claim 10, wherein
the solid-state image capture device is a TOF distance measuring sensor,
during the first exposure period, while a space including the object is illuminated with the infrared light having a pulse form, reflected light received during a predetermined period of time is read from the photoelectric conversion device to produce the first signal charge,
during the second exposure period, reflected light received during another predetermined period of time is read from the photoelectric conversion device to produce the second signal charge, and
during the third exposure period, an image of the object is captured without illumination with infrared light during another predetermined period of time to produce the third signal charge including only an ambient light component, and
the image capture device calculates a distance to the object based on a difference and ratio between the first signal charge, the second signal charge, and the third signal charge.

15. The image capture device of claim 4, wherein
the first and second pixels alternate in each column and row to form a checkerboard pattern, and
the signal charge from the first pixel and the signal charge from the second pixel are added together, the first and second pixels being adjacent to each other in the vertical direction.

16. The image capture device of claim 5, wherein
the solid-state image capture device is a stereo distance measuring sensor,
during the first exposure period, an image of the object is captured while a space including the object is illuminated with the infrared light, to generate the first signal charge,
after the signal charge remaining in the photoelectric conversion devices of all pixels is drained off to a substrate, an image of the object is captured in the presence of only ambient light without illumination with the infrared light to produce the second signal charge during the second exposure period, and
the image capture device removes an ambient light component by subtracting the second signal charge from the first signal charge, and calculates a distance to the object by triangulation.

17. The image capture device of claim 5, wherein
the solid-state image capture device is a pattern projection distance measuring sensor,
during the first exposure period, an image of the object is captured while a space including the object is illuminated with the infrared light having a predetermined pattern, to generate the first signal charge,
after the signal charge remaining in the photoelectric conversion devices of all pixels is drained off to a substrate, an image of the object is captured without illumination with the infrared light to produce the second signal charge during the second exposure period, and
the image capture device removes an ambient light component by subtracting the second signal charge from the first signal charge, and calculates a distance to the object based on a difference in position between each projection pattern.

18. The image capture device of claim 5, wherein
the solid-state image capture device is a TOF distance measuring sensor,
during the first exposure period, while a space including the object is illuminated with the infrared light having a pulse form, reflected light received during a predetermined period of time is read from the photoelectric conversion device, to produce the first signal charge,
during the second exposure period, reflected light received during another predetermined period of time is read from the photoelectric conversion device to produce the second signal charge, and
the image capture device calculates a distance to the object based on a ratio of the first signal charge to the second signal charge.

* * * * *